United States Patent
Kim et al.

(10) Patent No.: US 12,008,170 B2
(45) Date of Patent: Jun. 11, 2024

(54) ELECTRONIC DEVICE FOR CONTROLLING AT LEAST ONE EXTERNAL DEVICE AND OPERATING METHOD THEREOF

(71) Applicant: Samsung Electronics Co., Ltd., Suwon-si (KR)

(72) Inventors: Seungnyun Kim, Suwon-si (KR); Hyunjun Kim, Suwon-si (KR); Doosuk Kang, Suwon-si (KR); Bokun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 17/837,441

(22) Filed: Jun. 10, 2022

(65) Prior Publication Data

US 2023/0077094 A1   Mar. 9, 2023

Related U.S. Application Data

(63) Continuation of application No. PCT/KR2022/006576, filed on May 9, 2022.

(30) Foreign Application Priority Data

Sep. 7, 2021  (KR) ........................ 10-2021-0119376

(51) Int. Cl.
    G06F 3/01       (2006.01)
    G06F 3/0354    (2013.01)
    H04R 1/10      (2006.01)

(52) U.S. Cl.
    CPC .............. *G06F 3/017* (2013.01); *G06F 3/013* (2013.01); *G06F 3/016* (2013.01); *G06F 3/03547* (2013.01); *H04R 1/1041* (2013.01)

(58) Field of Classification Search
    CPC .......... G06F 3/017; G06F 3/013; G06F 3/016; G06F 3/03547; G06F 3/012; G06F 3/011; H04R 1/1041; H04R 5/033
    See application file for complete search history.

(56) References Cited

U.S. PATENT DOCUMENTS 9,712,954 B2 * 7/2017 Matsuda ................. H04W 4/80
9,811,818 B1   11/2017 Xing
(Continued)

FOREIGN PATENT DOCUMENTS

KR   10-2015-0137828    12/2015
KR   10-2017-0055278     5/2017
(Continued)

OTHER PUBLICATIONS

Search Report dated Aug. 5, 2022 in counterpart International Patent Application PCT/KR2022/006576.
(Continued)

*Primary Examiner* — Rodney Amadiz
(74) *Attorney, Agent, or Firm* — Nixon & Vanderhye, P.C.

(57) ABSTRACT

Provided is an electronic device including at least one communication module comprising communication circuitry; and a processor, wherein the processor is configured to: establish a first communication connection with a first external device using the at least one communication module, receive a first signal from the first external device through the first communication connection, perform a first function of a first application corresponding to the first signal upon receiving the first signal from the first external device through the first communication connection, based on identifying that a second communication connection with a second external device using the at least one communication module is not established, and perform a second function of a second application related to the second external
(Continued)

device corresponding to the first signal upon receiving the first signal from the first external device through the first communication connection, based on identifying that the second communication connection with the second external device using the at least one communication module is established.

20 Claims, 19 Drawing Sheets

(56) References Cited

U.S. PATENT DOCUMENTS

| | | |
|---|---|---|
| 2015/0347080 A1 | 12/2015 | Shin et al. |
| 2017/0134567 A1 | 5/2017 | Jeon et al. |
| 2017/0323285 A1 | 11/2017 | Xing |
| 2017/0329419 A1 | 11/2017 | Dearman et al. |
| 2019/0155388 A1 | 5/2019 | Lee et al. |
| 2020/0351958 A1 | 11/2020 | Lee et al. |

FOREIGN PATENT DOCUMENTS

| | | |
|---|---|---|
| KR | 10-2019-0056816 | 5/2019 |
| KR | 10-2020-0059428 | 5/2020 |
| KR | 10-2020-0127687 | 11/2020 |
| KR | 10-2021-0091662 | 7/2021 |

OTHER PUBLICATIONS

Written Opinion dated Aug. 5, 2022 in counterpart International Patent Application PCT/KR2022/006576.

* cited by examiner

ELECTRONIC DEVICE FOR CONTROLLING AT LEAST ONE EXTERNAL DEVICE AND OPERATING METHOD THEREOF

CROSS-REFERENCE TO RELATED APPLICATIONS

This application is a continuation of International Application No. PCT/KR2022/006576 designating the United States, filed on May 9, 2022, in the Korean Intellectual Property Receiving Office and claiming priority to Korean Patent Application No. 10-2021-0119376, filed on Sep. 7, 2021, in the Korean Intellectual Property Office, the disclosures of which are incorporated by reference herein in their entireties.

BACKGROUND

Field

The disclosure relates to an electronic device for controlling at least one external device and an operating method thereof.

Description of Related Art

Augmented reality (AR) is a technique for superimposing a three-dimensional (3D) (or two-dimensional (2D)) virtual image on an image or background of reality to display one image. An AR technique based on a hybrid of a real environment and a virtual object allows users to see the real environment to provide a better sense of reality and additional information. The user may observe an image together with a real environment and may identify, for example, information about an object in the currently observed environment.

An AR device may be a wearable electronic device. For example, an electronic device in the form of AR glasses wearable on a face, like glasses, has been spread.

An earset device may be a wearable electronic device. The earset device may include a first housing worn on the right ear and a second housing worn on the left ear. The earset device may include an input module for receiving a user input. For example, the user may input a command using a button or a touch pad included in an earphone device. A signal corresponding to a user input being input through the earphone device may be transmitted to a mobile device of the user for use in control of a designated application.

A dedicated controller for providing a user interaction scenario in an AR environment may be inconvenient to carry. In the AR environment, when the user interaction scenario is provided using a gesture input scheme, an input speed may be lowered depending on the number of mappings of the input gesture, and in this case, there may be a limitation in an operation of providing a haptic feedback.

SUMMARY

Embodiments of the disclosure provide an electronic device controlling at least one external device and may provide a detailed scenario for providing a user interaction through a wearable device such as an earset device connected to a mobile device.

According to various example embodiments, an electronic device may include: at least one communication module comprising communication circuitry; and a processor configured to: establish a first communication connection with a first external device using the at least one communication module, receive a first signal from the first external device through the first communication connection, perform a first function of a first application corresponding to the first signal, upon receiving the first signal from the first external device through the first communication connection, based on identifying that a second communication connection with a second external device using the at least one communication module is not established, and perform a second function of a second application related to the second external device corresponding to the first signal, upon receiving the first signal from the first external device through the first communication connection, based on identifying that the second communication connection with the second external device using the at least one communication module is established.

According to various example embodiments, a wearable electronic device may include: at least one communication module comprising communication circuitry; and at least one processor, wherein the at least one processor is configured to: establish a first communication connection with a first external device using the at least one communication module, identify a first input, control the at least one communication module to transmit a first signal related to the first input to the first external device through the first communication connection, based on identifying that a second communication connection with a second external device using the at least one communication module is not established, and control the at least one communication module to transmit a second signal related to the first input to the second external device through the second communication connection, based on identifying that the second communication connection with the second external device using the at least one communication module is established.

By providing an electronic device controlling at least one external device and an operating method of the electronic device according to various example embodiments, various user interaction scenarios may be provided in an AR environment using a wearable electronic device connected to a mobile device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
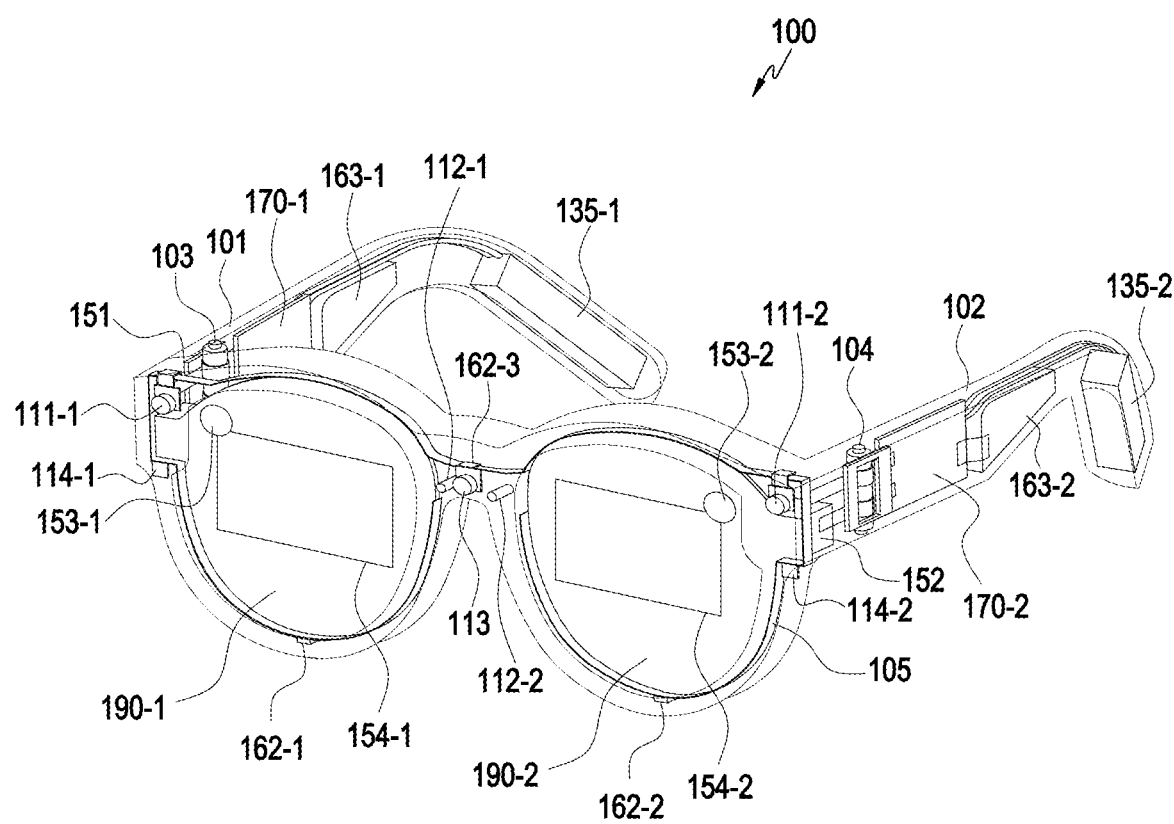
FIG. 1 is a perspective view illustrating an example wearable electronic device according to various embodiments.

FIG. 1 a perspective view illustrating an example wearable electronic device according to various embodiments. According to various embodiments, a wearable electronic device 100 of FIG. 1 may be a wearable electronic device in the form of glasses. For example, the wearable electronic device 100 may be an augmented reality (AR) glass device capable of displaying an AR screen (e.g., a three-dimensional (3D) screen). According to various embodiments, the wearable electronic device 100 may include a frame 105, a first support part 101, a second support part 102, a first hinge part 103 connecting the frame 105 with the first support part 101, and/or a second hinge part 104 connecting the frame 105 with the second support part 102. According to an embodiment, the frame 105 may include at least one camera (e.g., first cameras 111-1 and 111-2, second cameras 112-1 and 112-2, and/or a third camera 113), one or more light-emitting elements 114-1 and 114-2, at least one display (e.g., a first display 151 and a second display 152), one or more sound input devices 162-1, 162-2, and 162-3), or one or more transparent members 190-1 and 190-2. According to an embodiment, the wearable electronic device 100 may include one or more first cameras 111-1 and 111-2, one or more second cameras 112-1 and 112-2, and/or one or more third cameras 113. According to various embodiments, an image acquired through the one or more first cameras 111-1 and 111-2 may be used to detect a hand gesture by a user, track a head of the user, and/or spatial recognition. According to various embodiments, the one or more first cameras 111-1 and 111-2 may be global shutter (GS) cameras. According to various embodiments, the one or more first cameras 111-1 and 111-2 may perform a simultaneous localization and mapping (SLAM) operation through depth imaging. According to various embodiments, the one or more first cameras 111-1 and 111-2 may perform spatial recognition for 6 degrees of freedom (6DoF).

According to various embodiments, images acquired through one or more second cameras 112-1 and 112-2 may be used to detect and track user's pupils. For example, the images acquired through the one or more second cameras 112-1 and 112-2 may be used to track a gaze direction of the user. According to various embodiments, the one or more second cameras 112-1 and 112-2 may be GS cameras. According to various embodiments, the one or more second cameras 112-1 and 112-2 may correspond to the left eye and the right eye, respectively, and the performances of the one or more second cameras 112-1 and 112-2 may be substantially the same as or similar to each other.

According to various embodiments, the one or more third cameras 113 may be high-resolution cameras. According to various embodiments, the one or more third cameras 113 may perform an auto-focusing (AF) function or a shake correction function. According to various embodiments, the one or more third cameras 113 may be GS cameras or rolling shutter (RS) cameras.

According to various embodiments, the wearable electronic device 100 may include the one or more light-emitting elements 114-1 and 114-2. The light-emitting elements 114-1 and 114-2 are different from a light source to be described later that irradiates light to the screen output region of a display. According to various embodiments, the light-emitting elements 114-1 and 114-2 may radiate light for facilitating detection of pupils of the user to detect and track the pupils of the user through the one or more second cameras 112-1 and 112-2. According to various embodiments, the light-emitting elements 114-1 and 114-2 may include light-emitting diodes (LEDs). According to various embodiments, the light-emitting elements 114-1 and 114-2 may radiate light in an infrared region. According to various embodiments, the light-emitting elements 114-1 and 114-2 may be attached around the frame 105 of the wearable electronic device 100. According to various embodiments, the light-emitting elements 114-1 and 114-2 may be positioned around the one or more first cameras 111-1 and 111-2, and may assist gesture detection, head tracking, and/or spatial recognition by the one or more first cameras 111-1 and 111-2 when the wearable electronic device 100 is used in a dark environment. According to various embodiments, the light-emitting elements 114-1 and 114-2 may be positioned around the one or more third cameras 113, and may assist in image acquisition by the one or more third cameras 113 when the wearable electronic device 100 is used in the dark environment.

According to various embodiments, the wearable electronic device 100 may include a first display 151, a second display 152, one or more input optical members 153-1 and 153-2, one or more transparent members 190-1 and 190-2, and/or one or more screen display portions 154-1 and 154-2, which are positioned on the frame 105. According to various embodiments, the first display 151 and the second display 152 may include, for example, a liquid crystal display (LCD), a digital mirror device (DMD), a liquid crystal on silicon (LCoS), an organic light-emitting diode (OLED), or a micro light-emitting diode (micro LED). According to various embodiments, when the first display 151 and the second display 152 include one of an LCD, a DMD, or an LCoS, the wearable electronic device 100 may include a light source that radiates light to a screen output region of a display. According to other various embodiments, when the first display 151 and/or the second display 152 may generate light by itself, for example, may include one of an OLED or a micro LED, the wearable electronic device 100 may provide a virtual image of good quality to the user even when the wearable electronic device 100 does not include a separate light source.

According to various embodiments, the one or more transparent members 190-1 and 190-2 may be disposed to face the user's eyes when the user wears the wearable electronic device 100. According to various embodiments, the one or more transparent members 190-1 and 190-2 may include at least one of a glass plate, a plastic plate, or a polymer. According to various embodiments, when the user wears the wearable electronic device 100, the user may see the outside world through one or more transparent members 190-1 and 190-2. According to various embodiments, the one or more input optical members 153-1 and 153-2 may guide the light generated by the first display 151 and/or the second display 152 to the user's eyes. According to various embodiments, an image based on light generated by the first display 151 and the second display 152 may be formed on the one or more screen display portions 154-1 and 154-2 on the one or more transparent members 190-1 and 190-2, and the user may see the image formed on the one or more screen display portions 154-1 and 154-2.

According to various embodiments, the wearable electronic device 100 may include one or more optical waveguides (not shown). The optical waveguide may transmit the light generated by the first display 151 and the second display 152 to the user's eyes. The wearable electronic device 100 may include one optical waveguide corresponding to each of the left eye and the right eye. According to various embodiments, the optical waveguide may include at least one of glass, plastic, or polymer. According to various embodiments, the optical waveguide may include a nano pattern, for example, a polygonal or curved grating structure, formed on an internal or external surface. According to various embodiments, the optical waveguide may include a free-form type prism, and in this case, the optical waveguide may provide incident light to the user through a reflective mirror. According to various embodiments, the optical waveguide may include at least one of at least one diffractive element (e.g., a diffractive optical element (DOE), a holographic optical element (HOE)), or a reflective element (e.g., a reflective mirror), and guide display light emitted from a light source using at least one diffractive element or reflective element included in the optical waveguide. According to various embodiments, the diffractive element may include input/output optical members. According to various embodiments, the reflective element may include a member causing total reflection.

According to various embodiments, the wearable electronic device 100 may include one or more sound input devices 162-1, 162-2, 162-3 (e.g., a microphone), and receive a user's sound or a sound generated in the vicinity of the wearable electronic device 100. For example, the one or more sound input devices 162-1, 162-2, and 162-3 may receive a sound generated in the vicinity and transmit it to a processor (e.g., a processor 320 of FIG. 3).

According to various embodiments, one or more support parts (e.g., the first support part 101 and the second support part 102) may include a PCB (e.g., a first PCB 170-1 and a second PCB 170-2), one or more sound output devices 163-1 and 163-2, and one or more batteries 135-1 and 135-2. The first PCB 170-1 and the second PCB 170-2 may transmit an electric signal to components included in the wearable electronic device 100, such as a first camera 311, a second camera 312, a third camera 313, a display module 350, an audio module 361, and/or a sensor 380 to be described with reference to FIG. 3. According to various embodiments, the first PCB 170-1 and the second PCB 170-2 may be flexible PCBs (FPCBs). According to various embodiments, each of the first PCB 170-1 and the second PCB 170-2 may include a first substrate, a second substrate, and an interposer disposed between the first substrate and the second substrate. According to various embodiments, the wearable electronic device 100 may include the batteries 135-1 and 135-2. The batteries 135-1 and 135-2 may store power for operating the other components of the wearable electronic device 100. According to various embodiments, the one or more sound output devices 163-1 and 163-2 (e.g., speakers) may output audio data to the user. For example, a feedback to a user's command (or input) may be provided, or information about a virtual object may be provided to the user through audio data.

According to various embodiments, the wearable electronic device 100 may include the one or more hinge parts (e.g., the first hinge part 103 and the second hinge part 104). For example, the first hinge part 103 may allow the first support part 101 to be coupled to the frame 105 and to be pivotable with respect to the frame 105, and the second hinge part 104 may allow the second support part 102 to be coupled to the frame 105 and to be pivotable with respect to the frame 105.

Figure 2:
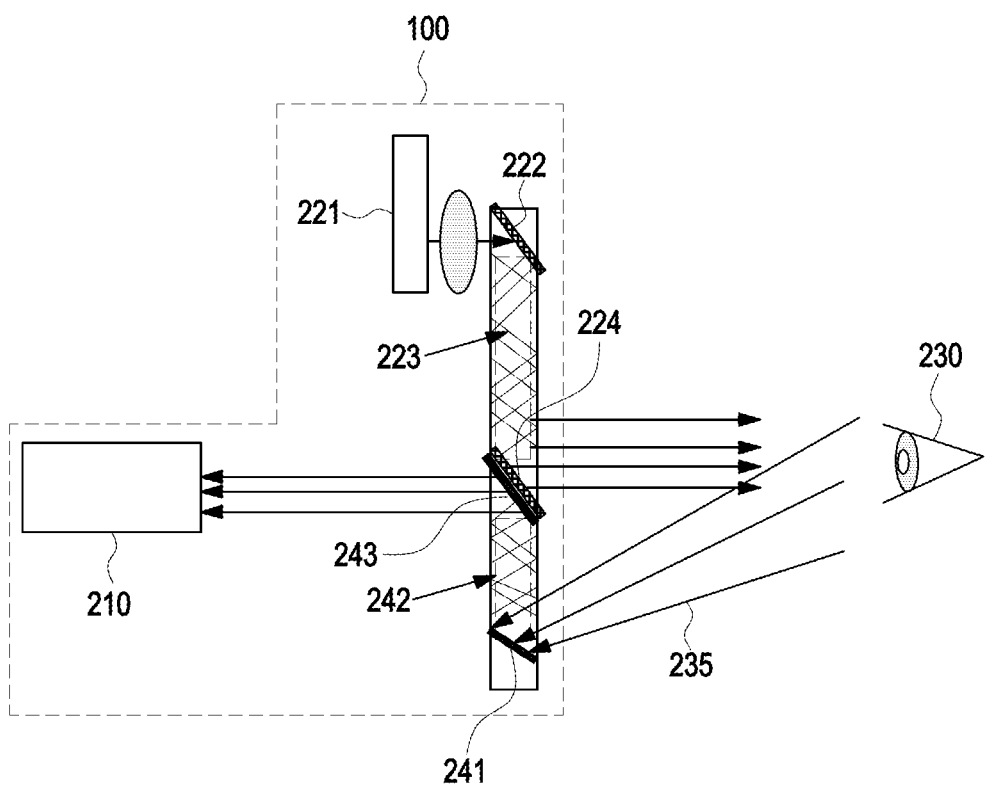
FIG. 2 is a diagram illustrating an example display and an eye-tracking camera of a wearable electronic device, according to various embodiments.

FIG. 2 is a diagram illustrating an example structure of a display and an eye-tracking camera of a wearable electronic device according to various embodiments. The wearable electronic device 100 includes a display 221, an input optical member 222, a display optical waveguide 223, an output optical member 224, an eye-tracking camera 210, a first splitter 241, an eye-tracking optical waveguide 242, and/or a second splitter 243.

In the wearable electronic device 100, the display 221 may be the first display 151 or the second display 152 illustrated in FIG. 1. The light output from the display 221 may pass through the input optical member 222 (e.g., the input optical members 153-1 and 153-2 of FIG. 1), may be incident to the display optical waveguide 223, and may be output through the output optical member 224 via the display optical waveguide 223. The light output from the output optical member 224 may be seen by an eye 230 of the user. Hereinafter, in this disclosure, the expression "displaying an object on a display" may refer, for example, to the light output from the display 221 being output through the output optical member 224 and the shape of an object may be seen to the eye 230 of the user by the light output through the output optical member 224. In addition, the expression "controlling the display to display an object" may refer, for example, to the light output from the display 221 being output through the output optical member 224 and the display 221 is controlled to allow the shape of the object to be seen to the user's eye 230 by the light output through the output optical member 224.

The light 235 reflected from the eye 230 of the user may pass through the first splitter 241 and be incident to the eye-tracking optical waveguide 242, pass through the eye-tracking optical waveguide 242, and output to the eye-tracking camera 210 through the second splitter 243. According to various embodiments, the light 235 reflected from the user's eye 230 may be light output from the light-emitting elements 114-1 and 114-2 of FIG. 1 and reflected from the user's eye 230. According to various embodiments, the eye-tracking camera 210 may be the one or more second cameras 112-1 and 112-2 shown in FIG. 1.

Figure 3:
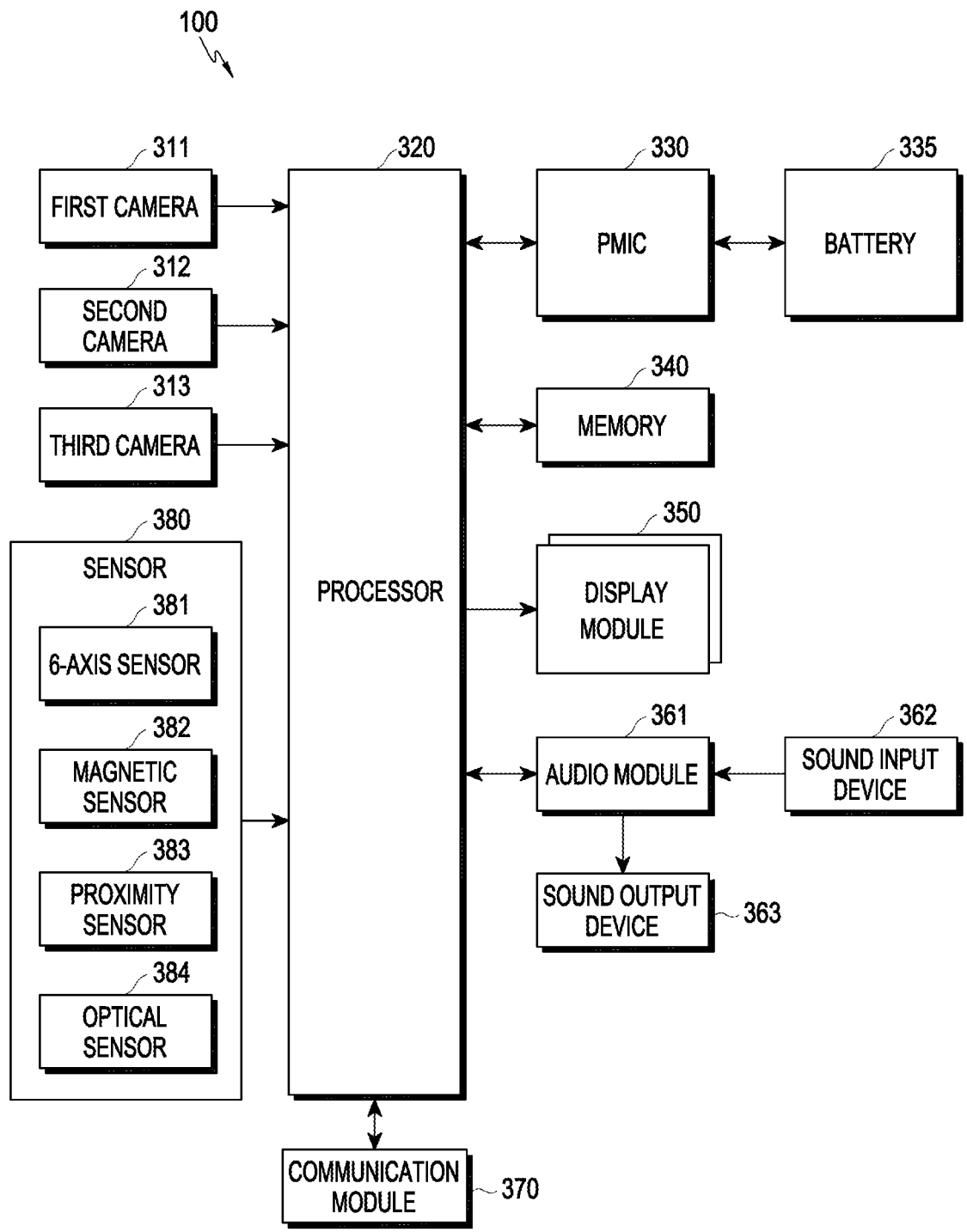
FIG. 3 is a block diagram illustrating an example configuration of a wearable electronic device according to various embodiments.

FIG. 3 is a block diagram illustrating an example configuration of a wearable electronic device according to various embodiments.

Referring to FIG. 3, according to various embodiments, the wearable electronic device 100 may include the first camera 311, the second camera 312, the third camera 313, the processor (e.g., including processing circuitry) 320, a micro-LED power management integrated circuit (PMIC) 330, a battery 335, a memory 340, the display module (e.g., including a display) 350, the audio module (e.g., including audio circuitry) 361, a sound input device (e.g., including sound input circuitry) 362, a sound output device (e.g., including sound output circuitry) 363, a communication module (e.g., including communication circuitry) 370, and or a sensor 380.

According to various embodiments, details of the one or more first camera 111-1 and 111-2, the one or more second cameras 112-1 and 112-2, and the one or more third cameras 113 described with reference to FIG. 1 may be substantially equally applied to the first camera 311, the second camera 312, and the third camera 313, respectively. According to various embodiments, the wearable electronic device 100 may include a plurality of at least one of the first camera 311, the second camera 312, and the third camera 313.

According to various embodiments, the processor 320 may include various processing circuitry, may control other components of the wearable electronic device 100, for example, the first camera 311, the second camera 312, the third camera 313, the PMIC 330, the memory 340, the display module 350, the audio module 361, the communication module 370, and/or the sensor 380, and may perform various data processing or operations.

According to various embodiments, the PMIC 330 may convert power stored in the battery 335 to have a current or voltage required by other components of the wearable electronic device 100 and supply the power to the other components of the wearable electronic device 100.

According to various embodiments, the memory 340 may store various data used by at least one component (e.g., the processor 320 or the sensor module 380) of the wearable electronic device 100.

According to various embodiments, the display module 350 may include a display and display a screen to be provided to the user. According to various embodiments, the display module 350 may include the first display 151, the second display 152, the one or more input optical members 153-1 and 153-2, the one or more transparent members 190-1 and 190-2, and/or the one or more screen display portions 154-1 and 154-2.

According to various embodiments, the audio module 361 may include various audio circuitry and be connected to the sound input device 362 and the sound output device 363 to convert data input through the sound input device 362 and convert data to be output to the sound output device 363. The sound output device 363 may include a speaker and/or an amplifier. The sound output device 363 may refer, for example, to the one or more sound output devices 163-1 and 163-2 of FIG. 1. The sound input device 362 may refer, for example, to the one or more input devices 162-1, 162-2, and 162-3 of FIG. 1.

According to various embodiments, the communication module 370 may include various communication circuitry and support establishment of a wireless communication channel with an electronic device external to the wearable electronic device 100 and execution of communication through the established communication channel.

According to various embodiments, the sensor 380 may include various sensors, including, for example, a 6-axis sensor 381, a magnetic sensor 382, a proximity sensor 383, and/or an optical sensor 384. According to various embodiments, the sensor 380 may include a sensor for acquiring a biosignal for detecting whether the wearable electronic device 100 is being worn by a user. For example, the sensor 380 may include at least one of a heart rate sensor, a skin sensor, or a temperature sensor.

According to various embodiments, the processor 320 may include various processing circuitry and identify movement of the user wearing the wearable electronic device 100 through the 6-axis sensor 381. For example, the 6-axis sensor 381 may detect change in a direction the user faces (e.g., a direction in which the user views through the wearable electronic device 100) to generate a sensor value, and transmit the generated sensor value or the amount of change in the sensor value to the processor 320.

According to various embodiments, the audio module 361 may receive a sound generated in the vicinity of the wearable electronic device 100 (or the user) through the sound input device 362, convert the received sound into data, transmit the data to the processor 320.

According to various embodiments, the communication module 370 may include various communication circuitry and transmit and/or receive data to and from an external electronic device (e.g., a wearable electronic device (e.g., an earphone) or an external electronic device (e.g., a terminal)). For example, the wearable electronic device 100 may receive audio data received by the external wearable electronic device through the communication module 370, and transmit the received audio data to the processor 320. As another example, the wearable electronic device 100 may output image data based on data received from an external electronic device through the communication module 370 through the display module 350.

Figure 4:
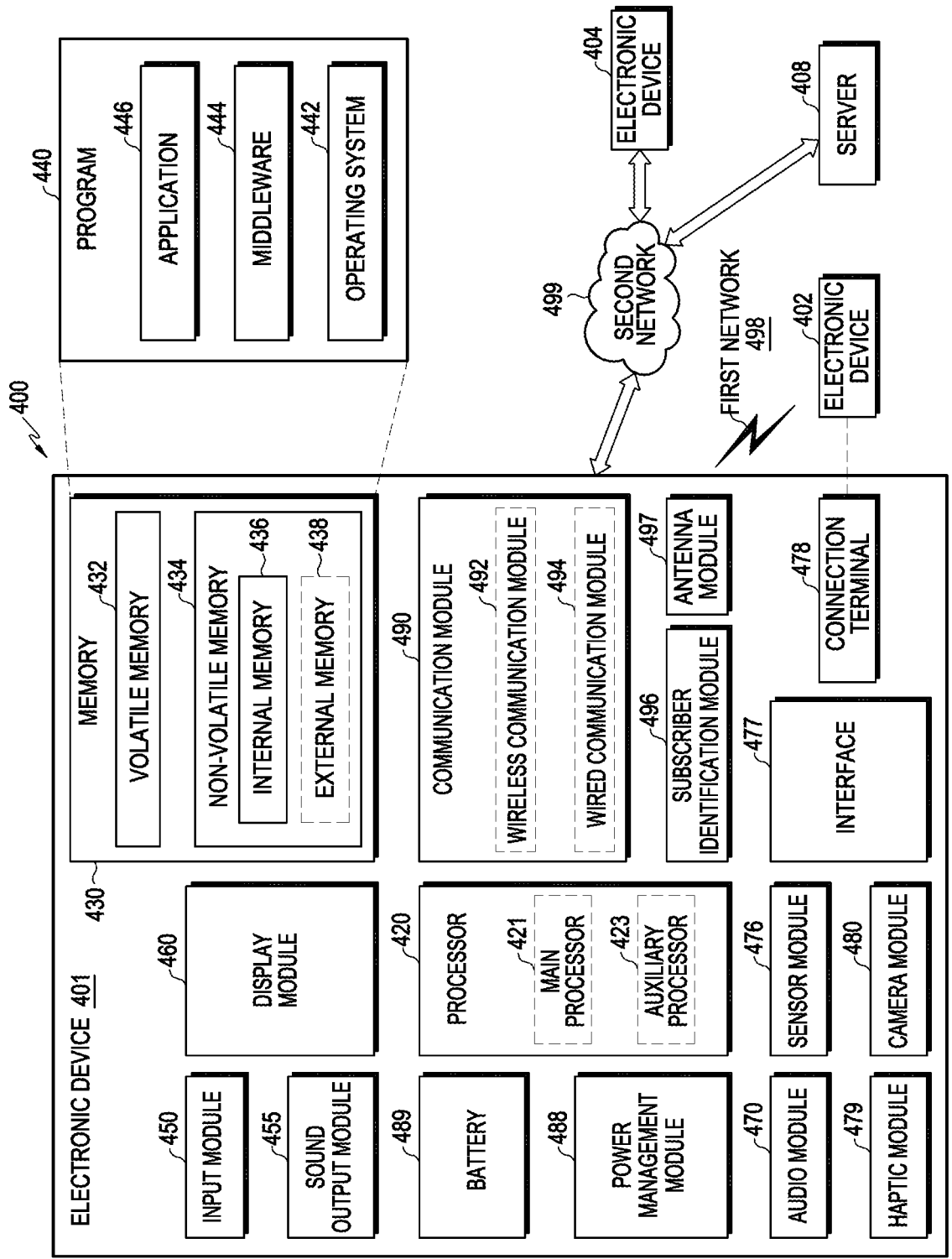
FIG. 4 is a block diagram illustrating an example electronic device in a network environment, according to various embodiments.

FIG. 4 is a block diagram illustrating an example electronic device in a network environment, according to various embodiments.

Referring to FIG. 4, an electronic device 401 in a network environment 400 may communicate with an electronic device 402 via a first network 498 (e.g., a short-range wireless communication network), or at least one of an electronic device 404 or a server 408 via a second network 499 (e.g., a long-range wireless communication network). According to an embodiment, the electronic device 401 may communicate with the electronic device 404 via the server 408. According to an embodiment, the electronic device 401 may include a processor 420, memory 430, an input module 450, a sound output module 455, a display module 460, an audio module 470, a sensor module 476, an interface 477, a connecting terminal 478, a haptic module 479, a camera module 480, a power management module 488, a battery 489, a communication module 490, a subscriber identification module (SIM) 496, or an antenna module 497. In various embodiments, at least one of the components (e.g., the connecting terminal 478) may be omitted from the electronic device 401, or one or more other components may be added in the electronic device 401. In various embodiments, some of the components (e.g., the sensor module 476, the camera module 480, or the antenna module 497) may be integrated as a single component (e.g., the display module 460).

The processor 420 may execute, for example, software (e.g., a program 440) to control at least one other component (e.g., a hardware or software component) of the electronic device 401 coupled with the processor 420, and may perform various data processing or computation. According to an embodiment, as at least part of the data processing or computation, the processor 420 may store a command or data received from another component (e.g., the sensor module 476 or the communication module 490) in volatile memory 432, process the command or the data stored in the volatile memory 432, and store resulting data in non-volatile memory 434. According to an embodiment, the processor 420 may include a main processor 421 (e.g., a central processing unit (CPU) or an application processor (AP)), or an auxiliary processor 423 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 401 includes the main processor 421 and the auxiliary processor 423, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display module 460, the sensor module 476, or the communication module 490) among the components of the electronic device 401, instead of the main processor 421 while the main processor 421 is in an inactive state (e.g., sleeps), or together with the main processor 421 while the main processor 421 is in an active state (e.g., executes an application). According to an embodiment, the auxiliary processor 423 (e.g., an image signal processor or a communication processor) may be implemented as part of another component (e.g., the camera module 480 or the communication module 490) functionally related to the auxiliary processor 423. According to an embodiment, the auxiliary processor 423 (e.g., the neural processing unit) may include a hardware structure specified for artificial intelligence model processing. An artificial intelligence model may be generated by machine learning. Such learning may be performed, e.g., by the electronic device 401 where the artificial intelligence is performed or via a separate server (e.g., the server 408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446

The input module 450 may receive a command or data to be used by another component (e.g., the processor 420) of the electronic device 401, from the outside (e.g., a user) of the electronic device 401. The input module 450 may include, for example, a microphone, a mouse, a keyboard, a key (e.g., a button), or a digital pen (e.g., a stylus pen).

The sound output module 455 may output sound signals to the outside of the electronic device 401. The sound output module 455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 460 may visually provide information to the outside (e.g., a user) of the electronic device 401. The display module 460 may include, for example, a display, a hologram device, or a projector and control circuitry to control a corresponding one of the display, hologram device, and projector. According to an embodiment, the display module 460 may include a touch sensor adapted to detect a touch, or a pressure sensor adapted to measure the intensity of force incurred by the touch.

The audio module 470 may convert a sound into an electrical signal and vice versa. According to an embodiment, the audio module 470 may obtain the sound via the input module 450, or output the sound via the sound output module 455 or a headphone of an external electronic device (e.g., the electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

The connecting terminal 478 may include a connector via which the electronic device 401 may be physically connected with the external electronic device (e.g., the electronic device 402). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to the electronic device 401. According to an embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or infrared data association (IrDA)) or the second network 499 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The wireless communication module 492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 492 may support a high-frequency band (e.g., the mmWave band) to achieve, e.g., a high data transmission rate. The wireless communication module 492 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 492 may support various requirements specified in the electronic device 401, an external electronic device (e.g., the electronic device 404), or a network system (e.g., the second network 499). According to an embodiment, the wireless communication module 492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less of 1 ms or less) for implementing URLLC.

The antenna module 497 may transmit or receive a signal or power to or from the outside (e.g., the external electronic device) of the electronic device 401. According to an embodiment, the antenna module 497 may include an antenna including a radiating element including a conductive material or a conductive pattern formed in or on a substrate (e.g., a printed circuit board (PCB)). According to an embodiment, the antenna module 497 may include a plurality of antennas (e.g., array antennas). In such a case, at least one antenna appropriate for a communication scheme used in the communication network, such as the first network 498 or the second network 499, may be selected, for example, by the communication module 490 (e.g., the wireless communication module 492) from the plurality of antennas. The signal or the power may then be transmitted or received between the communication module 490 and the external electronic device via the selected at least one antenna. According to an embodiment, another component (e.g., a radio frequency integrated circuit (RFIC)) other than the radiating element may be additionally formed as part of the antenna module 497.

According to various embodiments, the antenna module 497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. Each of the electronic devices 402 or 404 may be a device of a same type as, or a different type, from the electronic device 401. According to an embodiment, all or some of operations to be executed at the electronic device 401 may be executed at one or more of the external electronic devices 402, 404, or 408. For example, when the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, mobile edge computing (MEC), or client-server computing technology may be used, for example. The electronic device 401 may provide ultra low-latency services using, e.g., distributed computing or mobile edge computing. In an embodiment, the external electronic device 404 may include an internet-of-things (IoT) device. The server 408 may be an intelligent server using machine learning and/or a neural network. According to an embodiment, the external electronic device 404 or the server 408 may be included in the second network 499. The electronic device 401 may be applied to intelligent services (e.g., smart home, smart city, smart car, or healthcare) based on 5G communication technology or IoT-related technology.

Figure 5:
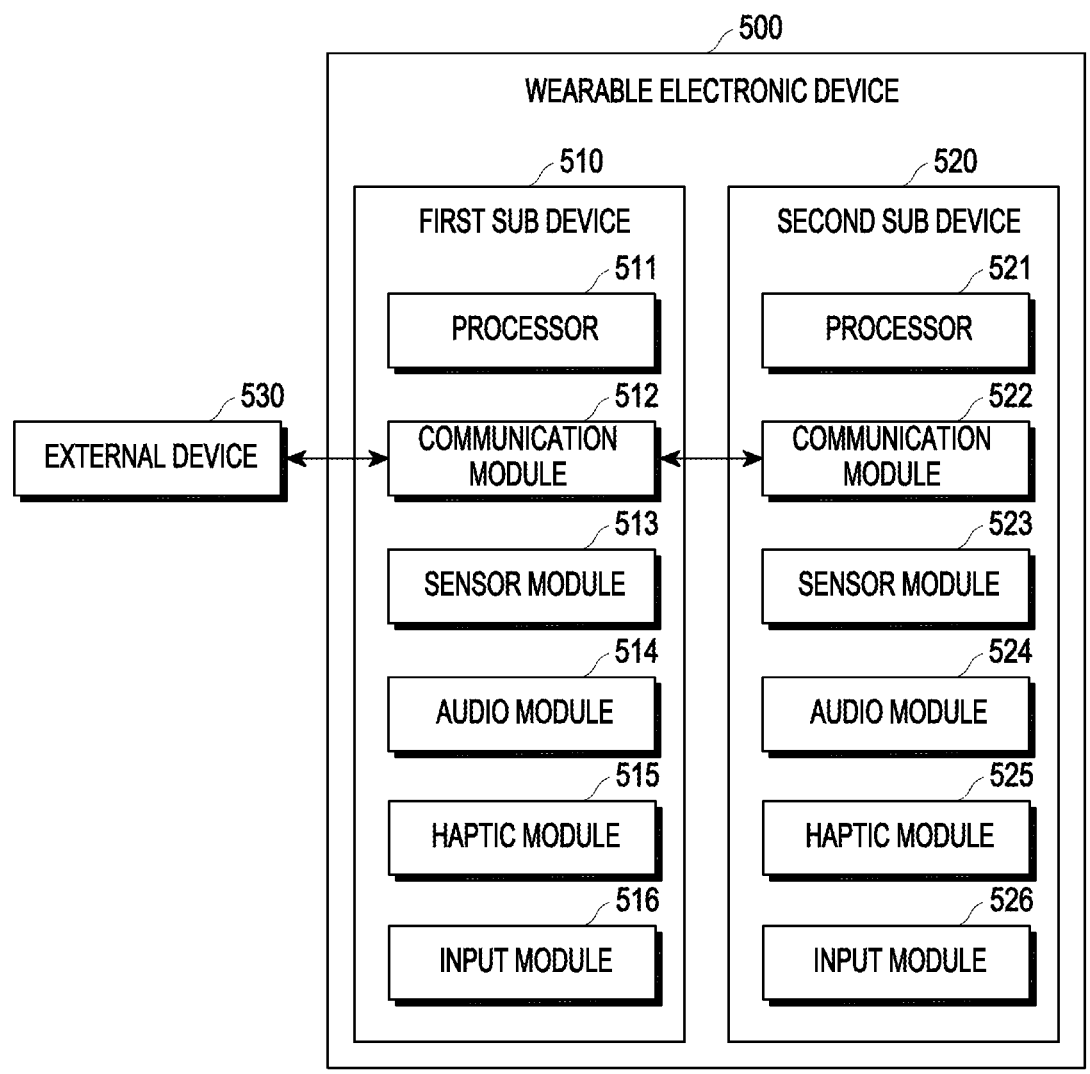
FIG. 5 is a block diagram illustrating an example configuration of a wearable electronic device according to various embodiments.

FIG. 5 is a block diagram illustrating an example configuration of a wearable electronic device according to various embodiments. According to various embodiments, a wearable electronic device 500 of FIG. 5 may be a wearable electronic device in the form of an earphone. According to various embodiments, the wearable electronic device 500 may include a plurality of housings separated physically. For example, when the wearable electronic device 500 is a wearable electronic device in the form of an earphone, the wearable electronic device 500 may include a first housing to be worn on the right ear (e.g., a first sub device 510) and a second housing to be worn on the left ear (e.g., a second sub device 520).

According to various embodiments, the wearable electronic device 500 may include the first sub device 510 and the second sub device 520. According to various embodiments, the first sub device 510 may include a processor (e.g., including processing circuitry) 511, a communication module (e.g., including communication circuitry) 512, a sensor module (e.g., including a sensor) 513, an audio module (e.g., including audio circuitry) 514, a haptic module (e.g., including haptic circuitry) 515, and/or an input module (e.g., including input circuitry) 516. The second sub device 520 may include a processor (e.g., including processing circuitry) 521, a communication module (e.g., including communication circuitry) 522, a sensor module (e.g., including a sensor) 523, an audio module (e.g., including audio circuitry) 524, a haptic module (e.g., including haptic circuitry) 525, and or an input module (e.g., including input circuitry) 526.

According to various embodiments, the processor 511 of the first sub device 510 may include various processing circuitry and receive data from other components of the first sub device 510, for example, the communication module 512, the sensor module 513, and the audio module 514, and/or the haptic module 515, perform an operation based on the received data, and transmit a signal for controlling another component to the other component. The processor 521 of the second sub device 520 may be understood similarly to the processor 511 of the first sub device 510.

According to various embodiments, the communication module 512 of the first sub device 510 may include various communication circuitry and perform wireless communication with another electronic device (e.g., an external device 530 or the second sub device 520). For example, the communication module 512 of the first sub device 510 may perform wireless communication with the external device 530 (e.g., the wearable electronic device 100 of FIG. 1, and/or the electronic device 401 of FIG. 4). For example, the communication module 512 of the first sub device 510 may perform wireless communication with the communication module 522 of the second sub device 520. According to various embodiments, the communication module 512 may transmit and receive information acquired from the wearable electronic device 500 (e.g., the first sub device 510 and/or the second sub device 520) to the external device 530. For example, the communication module 512 may transmit the information acquired from the first sub device 510 to the external device 530. For example, the communication module 512 may transmit the information received from the second sub device 520 to the external device 520. In another example, the communication module 512 may receive audio data from the external device 530. For example, the communication module 512 may transmit audio data received from the external device 530 to the second sub device 520. The type of communication supported by the communication module 512 may not be limited. The communication module 522 of the second sub device 520 may be understood similarly to the communication module 512 of the first sub device 510. For example, the communication module 522 may perform wireless communication with the communication module 512 of the first sub device 510 as disclosed in FIG. 5. According to an embodiment, the communication module 522 may not directly perform wireless communication with the external device 530 as disclosed in FIG. 5. In this case, the first sub device 510 may be called a primary device and the second sub device 520 may be called a secondary device. The primary device may perform communication with an external device (e.g., the external device 530) and may serve to transmit an event occurring in the secondary device to the external device (e.g., the external device 530). According to an embodiment, the second sub device 520 may operate as a primary device, and the first sub device 510 may operate as a secondary device, and there may be no restriction on role distribution between the primary device and the secondary device. For example, when the wearable electronic device 500 communicates with the external device 530, it may refer, for example, to the first sub device 510 operating as a primary device and the second sub device 520 operates as a secondary device, such that the first sub device 510 and the second sub device 520 perform wireless communication and the first sub device 510 and the external device 530 perform wireless communication. In another example, when the wearable electronic device 500 communicates with the external device 530, it may refer, for example, to the second sub device 520 operating as a primary device and the first sub device 510 operates as a secondary device, such that the second sub device 520 and the first sub device 510 perform wireless communication and the second sub device 520 and the external device 530 perform wireless communication. In another example, when the wearable electronic device 500 communicates with the external device 530, it may refer, for example, to the first sub device 510 (or the second sub device 520) operating alone, such that the second sub device 510 and the first sub device 510 (or the second sub device 520) and the external device 530 perform wireless communication.

According to various embodiments, the audio module 514 of the first sub device 510 may include various audio circuitry including, for example, a plurality of microphones and/or one or more speakers. According to various embodiments, the plurality of microphones may include a microphone directed toward the inner ear of the user when the user wears the first sub device 510 and a microphone directed away from the user when the user wears the first sub device 510. According to various embodiments, the audio module 514 may acquire audio data through a plurality of microphones, respectively. According to various embodiments, the audio module 514 may output audio data obtained from another electronic device (e.g., the external device 530 and/or the second sub device 520) through the communication module 512. The audio module 524 of the second sub device 520 may be understood similarly to the audio module 514 of the first sub device 510.

According to various embodiments, the sensor module 513 of the first sub device 510 may include at least one sensor, including for example, a biosensor for detecting whether the user wears the first sub device 510. For example, the biometric sensor may include at least one of a heart rate sensor, a skin sensor, or a temperature sensor. According to various embodiments, the sensor module 513 may include a geomagnetic sensor. The sensor module 523 of the second sub device 520 may be understood similarly to the sensor module 513 of the first sub device 510.

According to various embodiments, the haptic module 515 of the first sub device 510 and the haptic module 525 of the second sub device 520 may include various haptic circuitry and convert an electrical signal into a mechanical stimulus (e.g., a vibration or a movement) or electrical stimulus which may be recognized by a user via his tactile sensation or kinesthetic sensation. According to an embodiment, the haptic modules 515 and 525 may include, for example, a motor, a piezoelectric element, or an electric stimulator.

According to various embodiments, the input module 516 of the first sub-device 510 and the input module 526 of the second sub device 520 may include various input circuitry and receive a command or data to be used by another component (e.g., a processor 2220) of an electronic device 2201, from the outside (e.g., a user) of the electronic device 2201. For example, the input module 516 and the input module 526 may include a microphone, a key (e.g., a button), or a touch pad, without a limitation in input schemes used by the input module 516 and input module 526.

Although not shown, according to various embodiments, the wearable electronic device 500 may include a configuration similar to that included in the electronic device 401 of FIG. 4. For example, the wearable electronic device 500 may further include a memory (not shown) and/or a battery (not shown) of the electronic device 401 of FIG. 4, and those of ordinary skill in the art may understand that the configuration of the wearable electronic device 500 is not limited to the configuration shown in FIG. 5.

Figure 6:
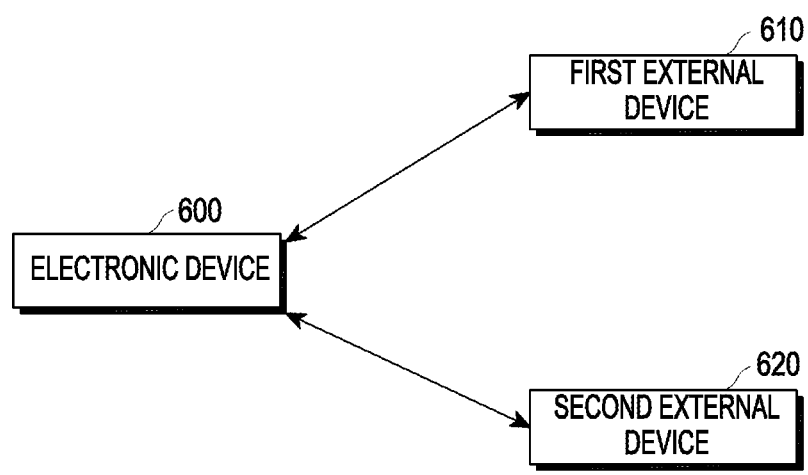
FIG. 6 is a block diagram illustrating an example configuration of electronic devices in a network environment, according to various embodiments.

FIG. 6 is a block diagram illustrating an example configuration of electronic devices in a network environment, according to various embodiments.

Referring to FIG. 6, electronic devices in a network environment may communicate with each other, and there is no limitation on a communication method.

Referring to FIG. 6, the network environment may include an electronic device 600 (e.g., the electronic device 401 of FIG. 4), a first external device 610 (e.g., the wearable electronic device 500 of FIG. 5) (e.g., a wearable electronic device in the form of an earphone), and a second external device 620 (e.g., the wearable electronic device 100 of FIG. 1 (e.g., a wearable electronic device in the form of glasses)).

According to various embodiments, the wearable electronic device 600 may communicate with the first external device 610 and/or the second external device 620. According to an embodiment, in FIG. 6, an embodiment is disclosed in which electronic devices (e.g., the first external device 610 and the second external device 620) in a network environment perform communication with the electronic device 600.

Figure 7:
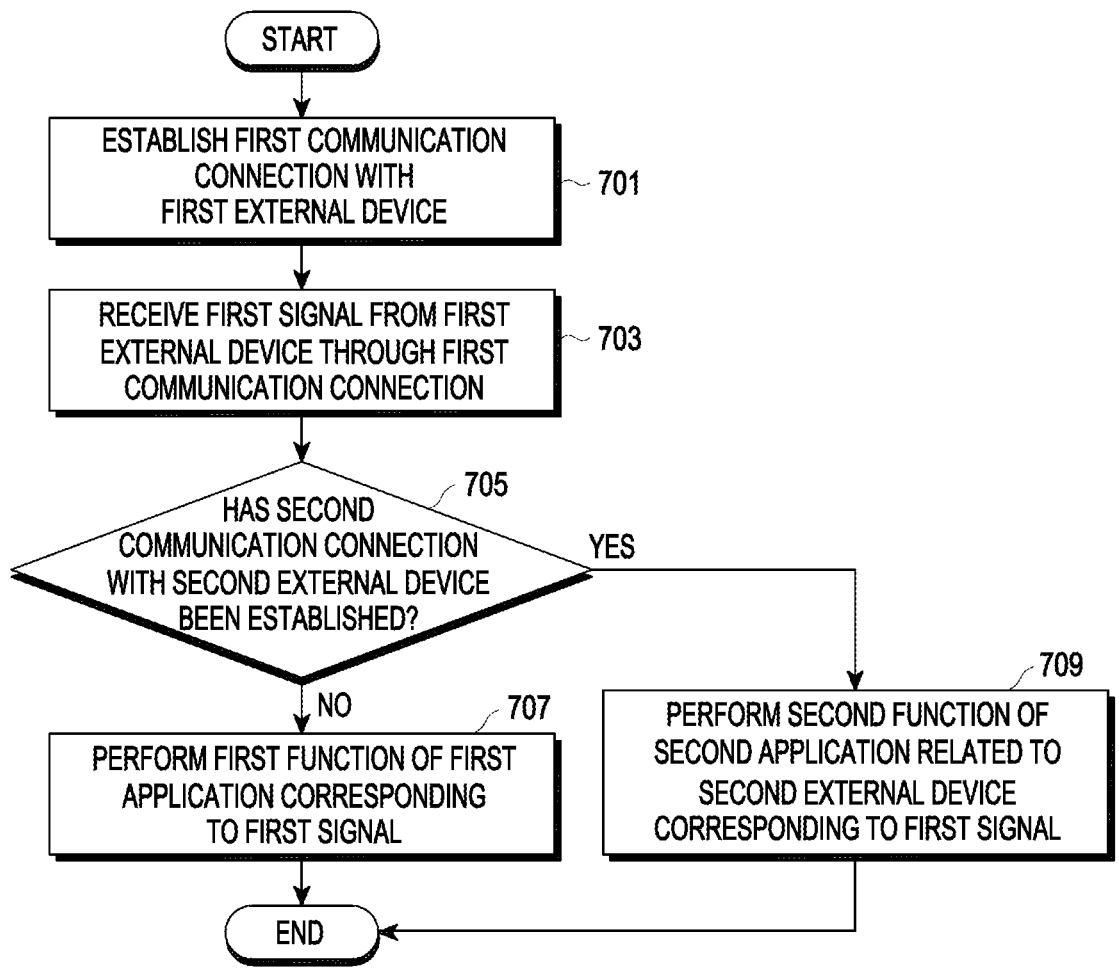
FIG. 7 is a flowchart illustrating an example method of operating an electronic device, according to various embodiments.

FIG. 7 is a flowchart illustrating an example method of operating an electronic device according to various embodiments. FIG. 7 will be described with reference to FIGS. 5 and 6.

Referring to FIG. 7, in operation 701, according to various embodiments, the electronic device 600 (e.g., the processor 420) may establish a first communication connection with the first external device 610 (e.g., the wearable electronic device 500 of FIG. 5).

In operation 703, according to various embodiments, the electronic device 600 may receive a signal (e.g., a first signal) from the first external device 610 through the first communication connection. For example, the electronic device 600 may perform a function corresponding to a signal based on the signal (e.g., the first signal) received from the first external device 610, and the function corresponding to the received signal will be described later with reference to FIG. 9. According to an embodiment, the first external device 610 may transmit a signal (e.g., the first signal) corresponding to a user input (e.g., a single touch, a double touch, a swipe, or a long press) input through at least one sub device (e.g., the first sub device 510 or the second sub device 520) among a plurality of sub devices (e.g., the first sub device 510 and the second sub device 520 of FIG. 5) to the electronic device 600.

In operation 705, according to various embodiments, the electronic device 600 may identify whether a second communication connection with the second external device 620 (e.g., the wearable electronic device 100 of FIG. 1) is established. For example, the electronic device 600 may be in a state in which a communication connection with the second external device 620 has not been established, and in this case, operation 707 may be performed. In another example, after establishing the first communication connection with the first external device 610, the electronic device 600 may establish the second communication connection with the second external device 620, or after establishing the second communication connection with the second external device 620, the electronic device 600 may establish the first communication connection with the first external device 610. The electronic device 600 may perform operation 709 based on identifying that the second communication connection with the second external device 620 has been established.

In operation 707, according to various embodiments, the electronic device 600 may perform a first function (e.g., playback, pause, playback of the previous song, playback of the next song, call reception, reception refusal, external sound listening, or artificial intelligence (AI) service call) of a first application (e.g., a music application or an application providing an AI service) corresponding to a first signal, upon receiving the first signal from the first external device 610 through the first communication connection, based on identifying that the second communication connection with the second external device 620 has not been established. For example, the first application (e.g., the music application) may be an application related to a unique function (e.g., sound playback) of the first external device 610 (e.g., a wearable electronic device in the form of an earphone), and a type of the first application may not be limited. For example, the first application may be an application that provides an AI service.

In operation 709, according to various embodiments, the electronic device 600 may perform a second function (e.g., selection of a virtual object, movement of a virtual pointer, or displaying of the next page) of a second application (e.g., an application for displaying a 3D screen) related to the second external device 620 corresponding to the first signal, upon receiving the first signal from the first external device 610 through the first communication connection, based on identifying that the second communication connection with the second external device 620 has been established. For example, the second application (e.g., the application for displaying the 3D screen) related to the second external device 620 may be an application related to a unique function (e.g., displaying of an AR display) of the second external device 620 (e.g., a wearable electronic device in the form of AR glasses), and a type of the second application may not be limited. In operation 709, according to various embodiments, the electronic device 600 may perform a second function (e.g., selection of a virtual object, movement of a virtual pointer, or displaying of the next page) of a second application (e.g., an application for displaying a 3D screen) related to the second external device 620 corresponding to the first signal, upon receiving the first signal from the first external device 610 through the first communication connection, based on a state in which the second application is executed and on identifying that the second communication connection with the second external device 620 is established.

Figure 8:
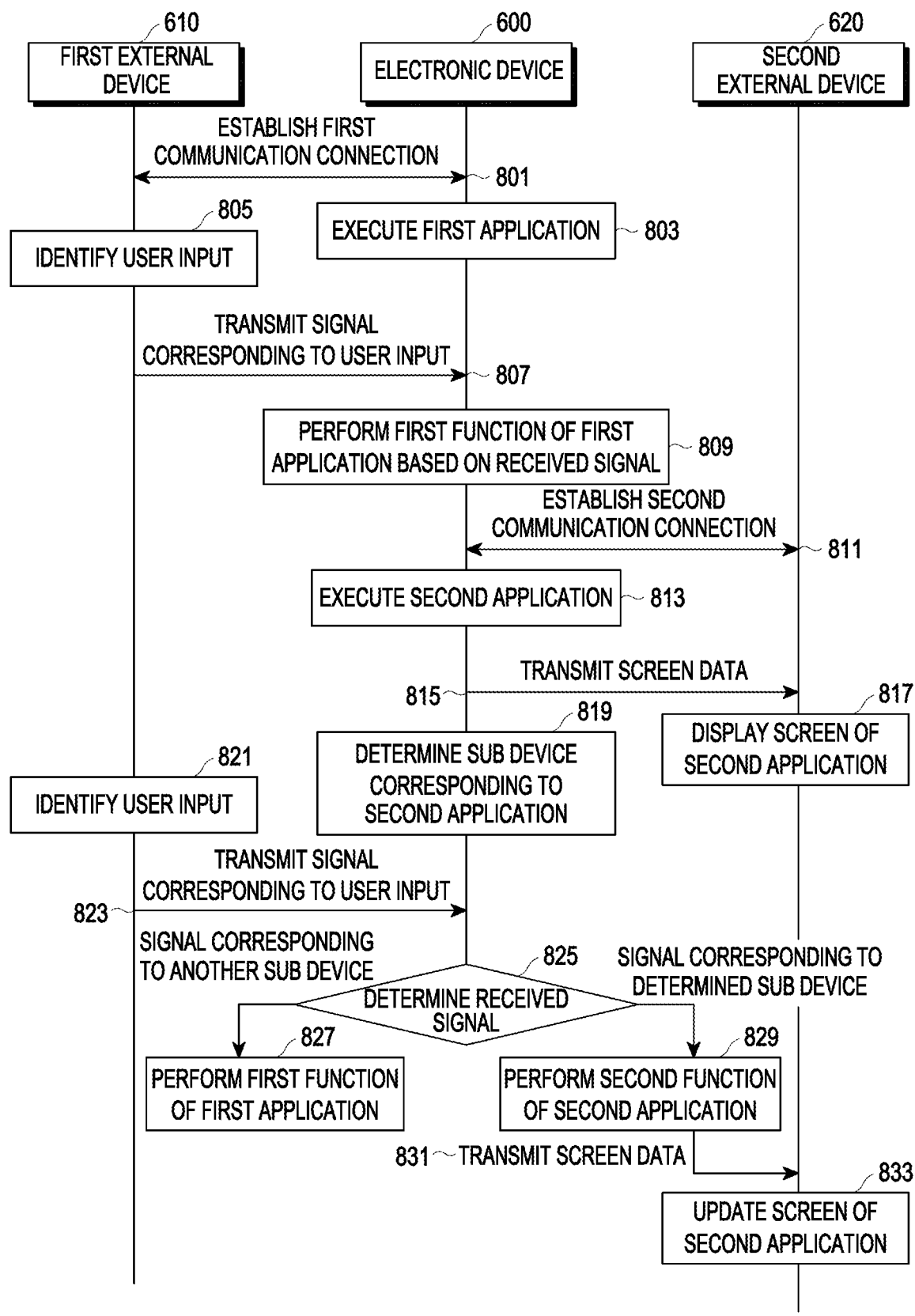
FIG. 8 is a signal flow diagram illustrating an example method of operating an electronic device, according to various embodiments.

FIG. 8 is a signal flow diagram illustrating an example method of operating an electronic device according to various embodiments. FIG. 8 will be described with reference to FIGS. 5 and 6.

Referring to FIG. 8, in operation 801, according to various embodiments, the electronic device 600 (e.g., the processor 420) may establish a first communication connection with the first external device 610 (e.g., the wearable electronic device 500 of FIG. 5).

In operation 803, according to various embodiments, the electronic device 600 may execute a first application (e.g., a music application or an application providing an AI service). For example, the electronic device 600 may execute the first application (e.g., the music application) related to a unique function (e.g., sound playback) of the first external device 610 (e.g., a wearable electronic device in the form of an earphone), and a type of the first application may not be limited. For example, the first application may be an application that provides an AI service.

In operation 805, according to various embodiments, the first external device 610 (e.g., at least one processor (e.g., the processor 511 and/or the processor 521) of the first external device 610) may identify a user input. For example, the first external device 610 may identify a user input (e.g., a single touch, a double touch, a swipe, or a long press) input through at least one sub device (e.g., the first sub device 510 or the second sub device 520) among a plurality of sub devices (e.g., the first sub device 510 and the second sub device 520 of FIG. 5) to the electronic device 600.

In operation 807, according to various embodiments, the first external device 610 may transmit a signal corresponding to the user input to the electronic device 600 through the first communication connection. For example, the first external device 610 may transmit a signal (e.g., the first signal) corresponding to the user input (e.g., the first user input) input through the first sub device 510 to the electronic device 600. For example, the first external device 610 may transmit a signal (e.g., the second signal) corresponding to the user input (e.g., the second user input) input through the second sub device 520 to the electronic device 600.

In operation 809, according to various embodiments, the electronic device 600 may perform a first function of a first application corresponding to a received signal (e.g., a first signal or a second signal), based on the signal (e.g., the first signal or the second signal) received from the first external device 610. The function corresponding to the signal will be described later with reference to FIG. 9. For example, the electronic device 600 may perform a first function (e.g., playback, pause, playback of the previous song, playback of the next song, call reception, reception refusal, external sound listening, or artificial intelligence (AI) call) of a first application (e.g., a music application or an application providing an AI service) corresponding to a first signal, upon receiving the first signal (e.g., a signal corresponding to a user input (e.g., the first user input) input through the first sub device 510) from the first external device 610 through the first communication connection, based on identifying that the second communication connection with the second external device 620 has not been established. Aternatively, for example, the electronic device 600 may perform the first function of the first application corresponding to the second signal, upon receiving the second signal (e.g., a signal corresponding to a user input (e.g., the second user input) input through the second sub device 520) from the first external device 610 through the first communication connection. According to an embodiment, the electronic device 600 may perform a different function (e.g., the first function or a third function) in the first application in correspondence to a first signal (e.g., a signal corresponding to a user input (e.g., the first user input) input through the first sub device 510) and a second signal (e.g., a signal corresponding to a user input (e.g., the second user input) input through the second sub device 520). For example, the electronic device 600 may perform the first function of the first application based on the first signal, and may perform the third function of the first application based on the second signal. For example, the third function may include a function distinct from the first function executed in the first application.

In operation 811, according to various embodiments, the electronic device 600 may establish the second communication connection with the second external device 620 (e.g., the wearable electronic device 100 of FIG. 1).

In operation 813, according to various embodiments, the electronic device 600 may execute the second application (e.g., an AR application). For example, the electronic device 600 may execute the second application (e.g., the AR application for displaying a 3D screen) related to a unique function (e.g., displaying of the 3D screen) of the second external device 620 (e.g., a wearable electronic device in the form of AR glasses), and a type of the second application may not be limited. For example, the electronic device 600 may execute the second application as the second communication connection with the second external device 620 has been established. In another example, after establishment of the second communication connection with the second external device 620, the electronic device 600 may execute the second application in response to a request for executing the second application. Alternatively, in another example, the electronic device 600 may execute the second application in response to the request for executing the second application in a state where the second communication connection with the second external device 620 is not established, and may establish the second communication connection with the second external device 620.

In operation 815, according to various embodiments, the electronic device 600 may transmit screen data to the second external device 620 through the second communication connection. For example, the electronic device 600 may transmit screen data for displaying a screen of the second application (e.g., the AR application) to the second external device 620.

In operation 817, according to various embodiments, the second external device 620 (e.g., the processor 320 of FIG. 3) may display a screen of the second application on a display (e.g., the display module 350 of FIG. 3), based on the screen data received from the electronic device 600.

In operation 819, according to various embodiments, the electronic device 600 may determine a sub device corresponding to the second application related to the second external device 620. When the electronic device 600 determines a sub device corresponding to the second application related to the second external device 620, it may refer, for example, to at least one sub device (e.g., the first sub device 510 or the second sub device 520) among the plurality of sub devices (e.g., the first sub device 510 and the second sub device 520) of the first external device 610 being determined as a device for controlling a function of the second application related to the second external device 620. In this case, the sub device determined as the device for controlling the function of the second application related to the second external device 620 may be referred to as a "determined sub device" or "control device", and sub devices other than the determined sub device may be referred to as "the other sub devices". For example, when the electronic device 600 determines the first sub device 510 (or the second sub device 520) as a control device (or a determined sub device), the electronic device 600 may control the function of the second application related to the second external device 620, based on a signal corresponding to a user input being input through the first sub device 510 (or the second sub device 520). A method in which the electronic device 600 determines a control device will be described later. According to an embodiment, when at least one sub device (e.g., the first sub device 510 or the second sub device 520) among the plurality of sub devices (e.g., the first sub device 510 and the second sub device 520) of the first external device 610 is determined as the control device, at least some of signals corresponding to user inputs input through the sub device determined as the control device may be used for an operation of controlling the function of the second application related to the second external device 620. For example, at least some of the signals corresponding to the user inputs input through the sub device determined as the control device may be used for an operation of controlling a function of the second application (e.g., the AR application) related to the second external device 620 and other at least some of them may be used for an operation of controlling a function of the first application (e.g., the music application or the application for providing the AI service). Alternatively, for example, all signals corresponding to the user inputs input through the sub device determined as the control device may be used for the operation of controlling the function of the second application (e.g., the AR application) related to the second external device 620. Each function corresponding to each signal will be described later with reference to FIG. 9.

In operation 821, according to various embodiments, the first external device 610 may identify a user input. Operation 821 may be understood similarly to operation 805.

In operation 823, according to various embodiments, the first external device 610 may transmit a signal corresponding to the user input to the electronic device 600 through the first communication connection. Operation 823 may be understood similarly to operation 807.

In operation 825, according to various embodiments, the electronic device 600 may determine a signal received from the first external device 610. For example, the electronic device 600 may determine whether the signal received from the first external device 610 is a signal corresponding to a user input (e.g., the first user input) input through the first sub device 510 or a signal corresponding to a user input (e.g., the second user input) input through the second sub device 520. According to an embodiment, the electronic device 600 may perform operation 829 based on the signal received from the first external device 610 being a signal corresponding to the determined sub device (e.g., the first sub device 510) and perform operation 827 based on the signal received from the first external device 610 being a signal corresponding to another sub device (e.g., the second sub device 520).

In operation 827, according to various embodiments, the electronic device 600 may perform a first function (e.g., playback, pause, playback of the previous song, playback of the next song, call reception, reception refusal, external sound listening, or AI service call) of the first application (e.g., the music application or the application providing the AI service) corresponding to the signal received from the first external device 610, based on the signal received from the first external device 610 being the signal (e.g., the second signal) corresponding to another sub device (e.g., the second sub device 520).

In operation 829, according to various embodiments, the electronic device 600 may perform the second function (e.g., selection of a virtual object, movement of a virtual pointer, or displaying of the next page) of the second application (e.g., the application for displaying a 3D screen) related to the second external device 620 corresponding to the signal received from the first external device 610, based on the signal received from the first external device 610 being the signal (e.g., the first signal) corresponding to the determined sub device (e.g., the first sub device 510).

In operation 831, according to various embodiments, the electronic device 600 may transmit screen data changed by performing of operation 829 to the second external device 620. In operation 833, according to various embodiments, the second external device 620 may update and display a screen of the second application on a display (e.g., the display module 350 of FIG. 3), based on the screen data received from the electronic device 600.

Figure 9:
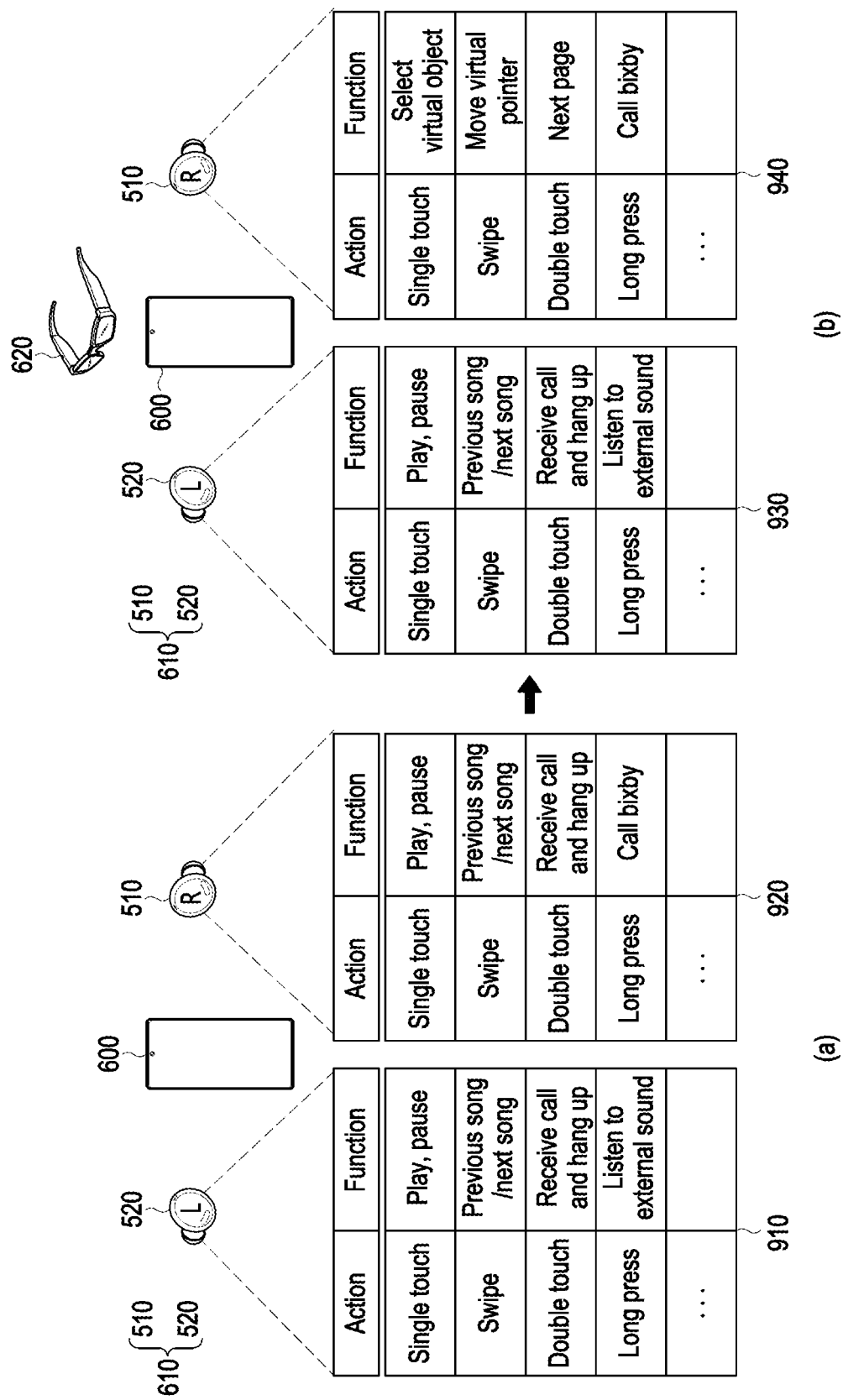
FIG. 9 is a diagram illustrating an example operation of an electronic device, according to various embodiments.

FIG. 9 is a diagram illustrating an example operation of an electronic device according to various embodiments. FIG. 9 will be described with reference to FIGS. 5, 6, and 15.

Referring to FIG. 9, (a) shows a state where a communication connection between the electronic device 600 and the second external device 620 is not established and a communication connection between the electronic device 600 and the first external device 610 is established. (b) of FIG. 9 shows a state in which the electronic device 600 establishes a communication connection with each of the first external device 610 and the second external device 620.

According to an embodiment, although not shown in FIG. 9, in association with an embodiment of FIG. 15 described in greater detail below, (a) of FIG. 9 may refer, for example, to a state where a communication connection between a wearable electronic device 1500 and a second external device 1520 (e.g., the wearable electronic device 100 of FIG. 1) is not established and a communication connection between the wearable electronic device 1500 and a first external device 1510 (e.g., the electronic device 401 of FIG. 4) is established. (b) of FIG. 9 may refer, for example, to a state in which the electronic device 1500 of FIG. 15 establishes a communication connection with each of the first external device 1510 and the second external device 1520.

Hereinafter, FIG. 9 will be described with reference to FIG. 6. It would be understood by those of ordinary skill in the art that the description of FIG. 9 may be applied to the example of FIG. 15. FIG. 9 shows a function of an application corresponding to a user input (e.g., a user's action) (or a signal corresponding to the user input).

According to various embodiments, (a) of FIG. 9 shows mapping tables 910 and 920 between a user input being input through the first external device 610 and a function of an application corresponding to the user input (or a signal corresponding to the user input) in a state where a communication connection between the electronic device 600 and the first external device 610 according to an embodiment is established.

According to various embodiments, (b) of FIG. 9 shows mapping tables 930 and 940 between a user input being input through the first external device 610 and a function of an application corresponding to the user input (or a signal corresponding to the user input) in a state where the electronic device 600 establishes a communication connection with each of the first external device 610 and the second external device 620 according to an embodiment is established.

Figure 15:
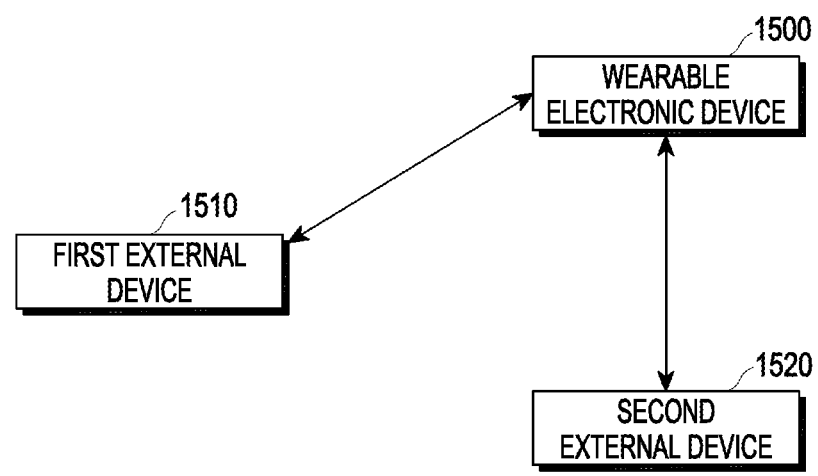
FIG. 15 is a block diagram illustrating an example configuration of electronic devices in a network environment, according to various embodiments.

According to various embodiments, the mapping tables 910, 920, 930, and 940 of FIG. 9 are merely examples for expressing that a correspondence relationship between a user input and a function of an application corresponding to the user input (or a signal corresponding to the user input) may change from (a) of FIG. 9 to (b) of FIG. 9 (or from (b) to (a)) depending on a state (e.g., a communication connection state) of the electronic device 600 of FIG. 6 or a state (e.g., a communication connection state) of the wearable electronic device 1500 of FIG. 15, and the correspondence relationship between the user input and the function of the application corresponding to the user input (or a signal corresponding to the user input) is not limited. For example, comparing 920 of (a) of FIG. 9 with 940 of (b) of FIG. 9, it is shown that, depending on a communication connection relationship between devices, in association with a user input being input through the first sub device 510, a function corresponding to some user inputs (e.g., a single touch, a swipe, a double touch) is changed and a function corresponding to other some user inputs (e.g., a long press) is not changed, but this is merely an example, and it would be understood by those of ordinary skill in the art that according to an implementation example, a function corresponding to any user input being input through the first sub device 510 may be changed depending on the communication connection relationship between devices.

According to various embodiments, the mapping tables 910, 920, 930, and 940 of FIG. 9 show that a control function related to the first sub device 510 may be changed when the first sub device 510 between the first sub device 510 and the second sub device 520 of the first external device 610 is determined as the control device. The control function may refer, for example, to a function controlled corresponding to the user input (or the signal corresponding to the user input) input through the control device. However, FIG. 9 shows that the control function of the sub device (e.g., the first sub device 510) selected as the control device from among the plurality of sub devices (e.g., the first sub device 510 and the second sub device 520) is changed, but this is merely an example, and those of ordinary skill in the art may understand that according to an implementation example, at least a part of the control function of each sub device (e.g., the first sub device 510 and/or the second sub device 520) may be changed.

According to an embodiment, a plurality of mapping tables including the mapping tables 910, 920, 930, and 940 shown in FIG. 9 may be stored in the memory 130 (or a memory (not shown) of the wearable electronic device 1500) of the electronic device 600 in the embodiment of FIG. 6 (or the wearable electronic device 1500 in the embodiment of FIG. 15). For example, the electronic device 600 in the embodiment of FIG. 6 (or the wearable electronic device 1500 in the embodiment of FIG. 15) may perform a function of an application corresponding to a user input (or a signal corresponding to the user input) based on a mapping table corresponding to the communication connection relationship between devices among the plurality of stored mapping tables. Alternatively, for example, the electronic device 600 in the embodiment of FIG. 6 (or the wearable electronic device 1500 in the embodiment of FIG. 15) may modify a mapping relationship between a user input and a function corresponding thereto according to a user's selection, and in this case, the electronic device 600 in the embodiment of FIG. 6 (or the wearable electronic device 1500 in the embodiment of FIG. 15) may control to display a screen for receiving the user's selection. A scheme to modify the mapping relationship between the user input and the function corresponding thereto may be merely an example, and a scheme to change a control function of a sub device may not be limited.

The mapping tables 910, 920, 930, and 940 disclosed in FIG. 9 may be merely examples, and according to various embodiments, although not shown, a mapping relationship between the user input (e.g., the user's action) and the application corresponding thereto may be defined. For example, the single touch of the first sub device 510 may be mapped to correspond to the first application (e.g., the music application in a first state (e.g., a state as shown in (a) of FIG. 9), and the single touch of the first sub device 510 may be mapped to correspond to the second application (e.g., the AR application) in a second state (a state as shown in (b) of FIG. 9)). In this case, the electronic device 600 may allocate each signal corresponding to each user input to each application (e.g., the first application or the second application) to which each user input is mapped, and identify each signal through each application, thus performing the mapped function.

Figure 10:
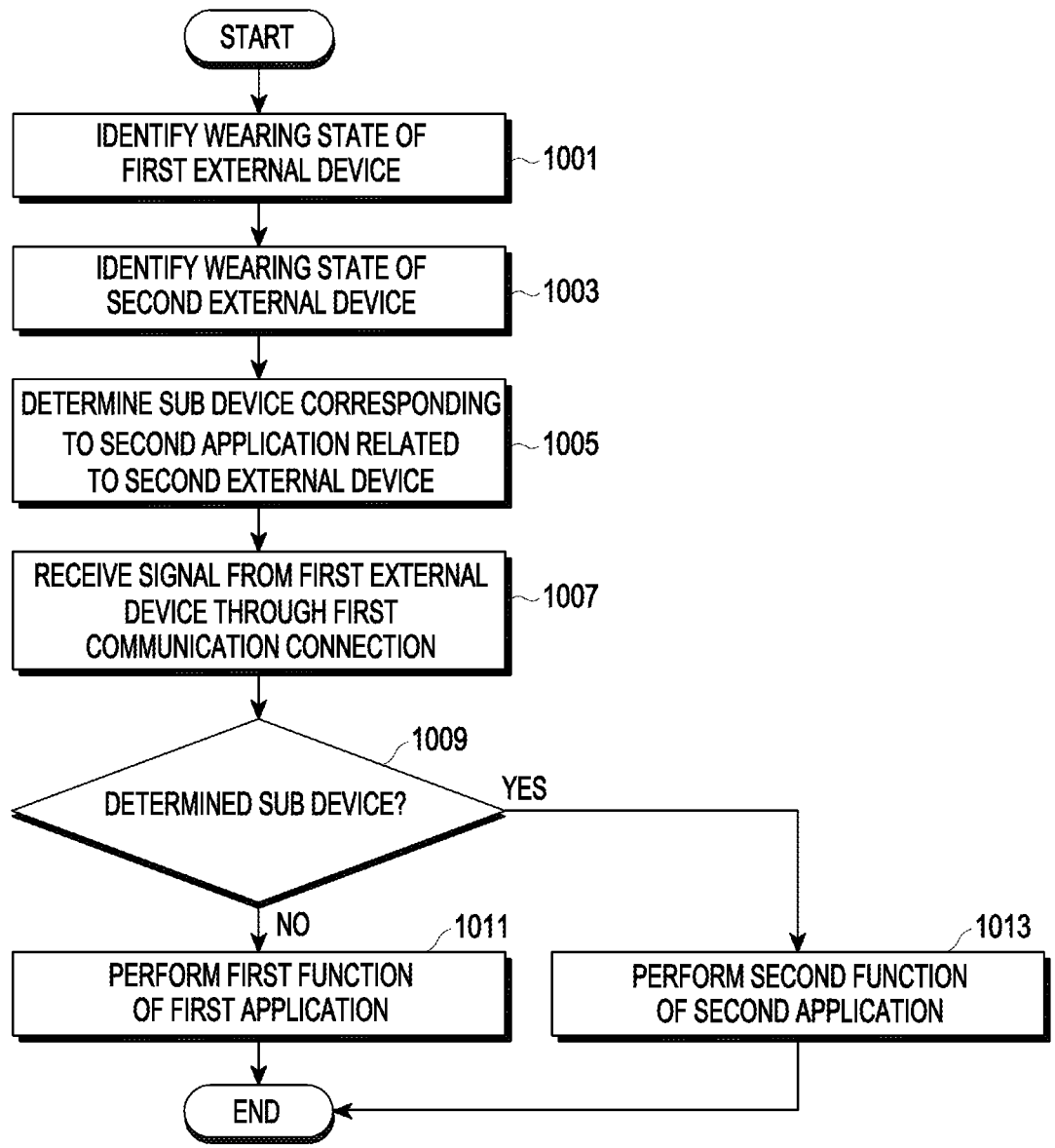
FIG. 10 is a flowchart illustrating an example method of operating an electronic device according to various embodiments.

FIG. 10 is a flowchart illustrating an example method of operating an electronic device according to various embodiments. FIG. 10 will be described with reference to FIGS. 5 and 6.

Referring to FIG. 10, in operation 1001, according to various embodiments, the electronic device 600 (e.g., the processor 420) may identify a wearing state of the first external device 610 (e.g., the wearable electronic device in the form of an earphone). The wearing state may refer, for example, to a state regarding whether the user wears the corresponding device. For example, the electronic device 600 may identify the wearing state of each of the plurality of sub devices (e.g., the first sub device 510 and the second sub device 520) of the first external device 610. For example, the first external device 610 may transmit information about the wearing state of each of the plurality of sub devices (e.g., the first sub device 510 and the second sub device 520) to the electronic device 600.

In operation 1003, according to various embodiments, the electronic device 600 may identify the wearing state of the second external device 620 (e.g., the wearable electronic device in the form of AR glasses). For example, the second external device 620 may transmit information about the wearing state of the second sub device 620 to the electronic device 600.

In operation 1005, according to various embodiments, the electronic device 600 may determine at least one sub device among the plurality of sub devices (e.g., the first sub device 510 and/or the second sub device 520) of the first external device 610 as a sub device (e.g., a control device) corresponding to the second application (e.g., the AR application) related to the second external device 620, at least based on the wearing state of the first external device 610 and/or the wearing state of the second external device 620. For example, when the user is not wearing the second external device 620, the electronic device 600 may not determine the sub device corresponding to the second application (e.g., the AR application) related to the second external device 620. In this case, the electronic device 600 may perform the first function (e.g., playback, pause, playback of the previous song, playback of the next song, call reception, reception refusal, external sound listening, or AI service call) of the first application (e.g., the music application or the application providing the AI service), based on the signal corresponding to the user input being input through the first sub device 510 and/or the second sub device 520 of the first external device 610. In another example, when the user is not wearing the first external device 610, the electronic device 600 may not determine the sub device corresponding to the second application (e.g., the AR application) related to the second external device 620. In this case, the electronic device 600 may perform the second function (e.g., selection of a virtual object, movement of a virtual pointer, or displaying of the next page) of the second application (e.g., the application for displaying the 3D screen) related to the second external device 620, based on a voice input of the user or a gaze input of the user identified using the second external device 620. In another example, when the user is wearing the first external device 610 and the second external device 620, the electronic device 600 may determine at least one sub device (e.g., the first sub device 510 or the second sub device 520) among the plurality of sub devices (e.g., the first sub device 510 and the second sub device 520) of the first external device 610 as the sub device corresponding to the second application (e.g., the AR application) related to the second external device 620. In another example, when the user is wearing one sub device (e.g., the first external device 610 or the second external device 620) among the plurality of sub devices (e.g., the first sub device 510 and the second sub device 520) of the first external device 610, the electronic device 600 may not determine the sub device corresponding to the second application (e.g., the AR application) related to the second external device 620. In this case, the electronic device 600 may control to display a screen for selecting whether to control the second application (e.g., the AR application) related to the second external device 620 on a display of the electronic device 600 (e.g., the display module 460) or a display of the second external device 620 (e.g., the display module 350), using one sub device worn by the user (e.g., one of the first sub device 510 and the second sub device 520). In another example, when the user is not wearing the first external device 610 and is wearing the second external device 620, the electronic device 600 may determine at least one sub device (e.g., the first sub device 510 or the second sub device 520) among the plurality of sub devices (e.g., the first sub device 510 and the second sub device 520 of FIG. 5) of the first external device 610 as the sub device corresponding to the second application (e.g., the AR application) related to the second external device 620, based on to communication connection being established between the electronic device 600 and each of the first external device 610 and the second external device 620. For example, the electronic device 600 may receive a signal related to an input (e.g., a touch, a long press, a swipe input) identified through the first external device 610 in a state where the user does not wear the first external device 610, based on a communication connection being established between each of the first external device 610 and the second external device 620 and the electronic device 600 According to an embodiment, the electronic device 600 may determine at least one sub device among the plurality of sub devices (e.g., the first sub device 510 and/or the second sub device 520) of the first external device 610 as a sub device (e.g., a control device) corresponding to the second application (e.g., the AR application) related to the second external device 620, based on a wearing state (e.g., the wearing state of the first external device 620 and/or the wearing state of the second external device 620) and a communication connection state (e.g., a communication connection state between the electronic device 600 and the first external device 610 and/or the second external device 620). A scheme to determine a control device based on the communication connection state has been described above with reference to FIGS. 5 through 9. According to an embodiment, the electronic device 600 may change a sub device (e.g., a control device) corresponding to the second application (e.g., the AR application, based on the wearing state (e.g., the wearing state of the first external device 610 and/or the wearing state of the second external device 620) and the communication connection state (e.g., the communication connection state between the electronic device 600 and the first external device 610 and/or the second external device 620) being changed, even after determining the sub device (e.g., the control device) corresponding to the second application (e.g., the AR application) related to the second external device 620. The above-described scheme for the electronic device 600 to determine the control device at least based on the wearing state of the first external device 610 and/or the wearing state of the second external device 620 may be merely an example and may not be limited.

In operation 1007, according to various embodiments, the electronic device 600 may receive a signal from the first external device 610 through the first communication connection. For example, the electronic device 600 may receive a signal (e.g., the first signal) corresponding to a user input (e.g., the first user input) input through the first sub device 510 and a signal (e.g., the second signal) corresponding to a user input (e.g., the second user input) input through the second sub device 520.

In operation 1009, according to various embodiments, the electronic device 600 may identify whether the signal received from the first external device 610 is a signal corresponding to a user input being input through the sub device determined as the control device.

In operation 1011, according to various embodiments, the electronic device 600 may perform the first function (e.g., playback, pause, playback of the previous song, playback of the next song, call reception, reception refusal, external sound listening, or AI service call) of the first application (e.g., the music application or the application providing the AI service) corresponding to the received signal, based on the signal (e.g., the first signal or the second signal) received from the first external device 610 not being the signal corresponding to the user input being input through the sub device determined as the control device.

In operation 1013, according to various embodiments, the electronic device 600 may perform the second function (e.g., selection of a virtual object, movement of a virtual pointer, or displaying of the next page) of the second application (e.g., the application for displaying a 3D screen) related to the second external device 620 corresponding to the received signal, based on the signal (e.g., the first signal or the second signal) received from the first external device 610 being the signal corresponding to the sub device determined as the control device.

Figure 11A:
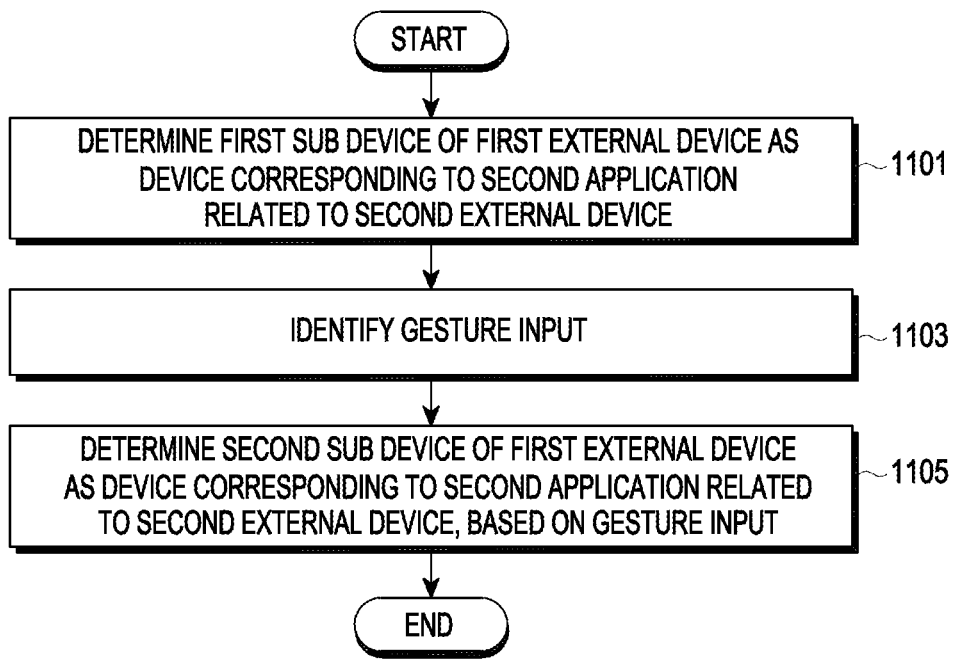
FIG. 11A is a flowchart illustrating an example method of operating an electronic device, according to various embodiments.

FIG. 11A is a flowchart illustrating an example method of operating an electronic device according to various embodiments. FIG. 11A will be described with reference to FIGS. 5 and 6.

Referring to FIG. 11A, in operation 1101, according to various embodiments, the electronic device 600 (e.g., the processor 420) may determine at least one sub device (e.g., the first sub device 510) of the first external device 610 as a device (e.g., the control device) corresponding to the second application (e.g., the AR application) related to the second external device 620. The scheme to determine the control device has been described above with reference to FIGS. 6 through 10.

In operation 1103, according to various embodiments, the electronic device 600 may identify a gesture input (e.g., an action of touching a virtual object displayed on the AR screen by the right hand) of the user. For example, the electronic device 600 may identify the gesture input using the second external device 620. For example, the second electronic device 620 may identify the gesture input of the user using at least one camera (e.g., the first camera 311, the second camera 312, and/or the third camera 313 of FIG. 3) of the second external device 620, and transmit information regarding the identified gesture input to the electronic device 600. Alternatively, for example, the electronic device 600 may identify the user's gesture input using the camera module 480, and a scheme for the electronic device 600 to identify the user's gesture input is not limited.

In operation 1105, according to various embodiments, the electronic device 600 (e.g., the processor 420) may determine at least one other sub device (e.g., the second sub device 520) of the first external device 610 as a device (e.g., the control device) corresponding to the second application (e.g., the AR application) related to the second external device 620, based on the identified gesture input. For example, the second sub device 520 may be changed to the control device based on the gesture input being input using a body part corresponding to the first sub device 510 determined as the control device out of the body of the user. For example, the electronic device 600 may determine the first sub device 510 controlled by the right hand of the user as the control device of the AR application and then determine the second sub device 520 controlled by the left hand of the user as the control device of the AR application upon identifying a gesture input being input using the right hand of the user with respect to the AR screen.

Figure 11B:
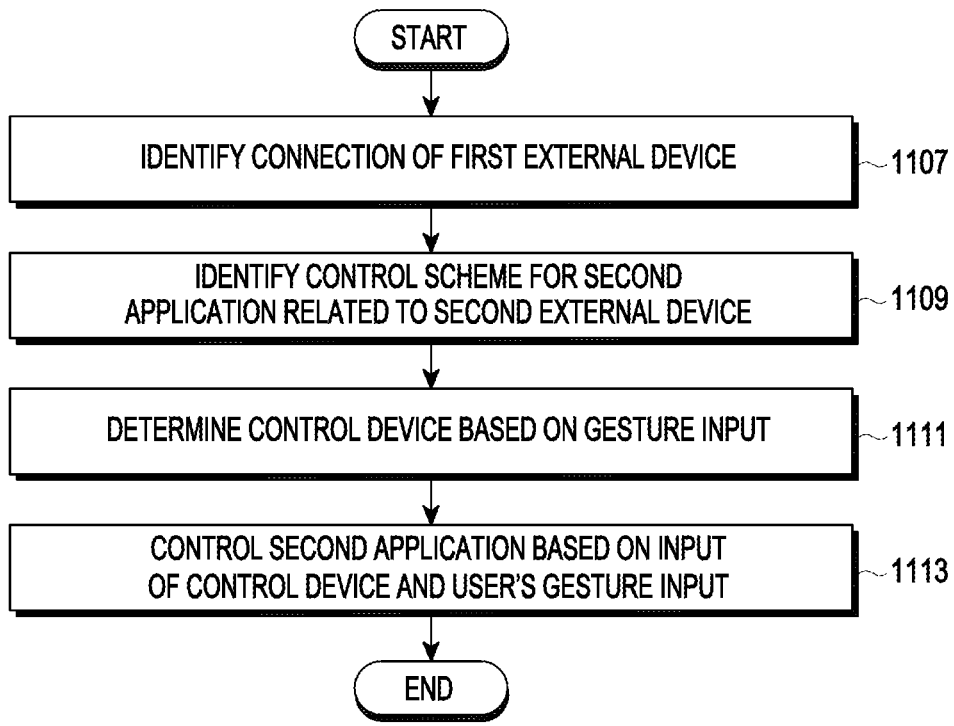
FIG. 11B is a flowchart illustrating an example method of operating an electronic device according to various embodiments.

According to various embodiments, an input signal of the second application related to the second external device 620 may be generated by combining the gesture input in operation 1103 with an input to an external device (e.g., the second sub device 520) determined as the control device. For example, a position of a target virtual object may be designated by a directional gesture of the hand, and a virtual object may be selected (or executed) by a user input (e.g., a touch, etc.) of the control device (e.g., the second sub device 520). FIG. 11B is a flowchart for describing an operating method of an electronic device according to various embodiments. FIG. 11B will be described with reference to FIGS. 5 and 6.

Referring to FIG. 11B, in operation 1107, according to various embodiments, the electronic device 600 (e.g., the processor 420) may identify a connection of the first external device 610. For example, the electronic device 600 may establish a communication connection with the first external device 610 (e.g., the wearable electronic device in the form of an earphone) in a state of being communication-connected with the second external device 620 (e.g., the wearable electronic device in the form of glasses).

In operation 1109, according to various embodiments, the electronic device 600 may identify a control scheme for the second application (e.g., the AR application) related to the second external device 620. For example, the electronic device 600 may control the second application based on an input of the external device (e.g., at least one of the first sub device 510 or the second sub device 520) determined as the control device and a gesture input (e.g., a gesture input similar to the gesture input described with reference to operation 1103) according to the identified control scheme (e.g., a scheme to combine an input of the external device with a gesture input). In another example, the electronic device 600 may control the second application based on an input of the external device (e.g., at least one of the first sub device 510 or the second sub device 520) determined as the control device according to the identified control scheme (e.g., an external device input scheme). In another example, the electronic device 600 may control the second application based on a gesture input (e.g., a gesture input similar to the gesture input described with reference to operation 1103) according to the identified control scheme (e.g., a gesture input scheme). The above-described control scheme may be merely an example, and may not be limited. According to an embodiment, the electronic device 600 may perform operation 1111 based on determining to control the second application at least based on an input of the external device (e.g., at least one of the first sub device 510 or the second sub device 520) determined as the control device, as the control scheme for the second application.

In operation 1111, according to various embodiments, the electronic device 600 may determine at least one sub device (e.g., the second sub device 520) among the plurality of sub devices (e.g., the first sub device 510 and/or the second sub device 520) of the first external device 610 as the control device, based on the gesture input (e.g., the action of touching a virtual object displayed on the AR screen). For example, the electronic device 600 may determine the control device based on whether the identified gesture input is a left-hand gesture input or a right-hand gesture input. For example, the electronic device 600 may determine the second sub device 520 controlled by the left hand of the user as the control device of the AR application based on identifying the right-hand gesture input of the user with respect to the AR screen.

In operation 1113, according to various embodiments, the electronic device 600 may control the second application (e.g., the AR application) related to the second external device 620, based on an input of the external device (e.g., the second sub device 520) determined as the control device and a user's gesture input (e.g., a gesture input similar to the gesture input disclosed in the description of operation 1103). For example, a position of a target virtual object may be designated by a directional gesture of the hand, and a virtual object may be selected (or executed) by a user input (e.g., a touch, etc.) of the control device (e.g., the second sub device 520).

Figure 12:
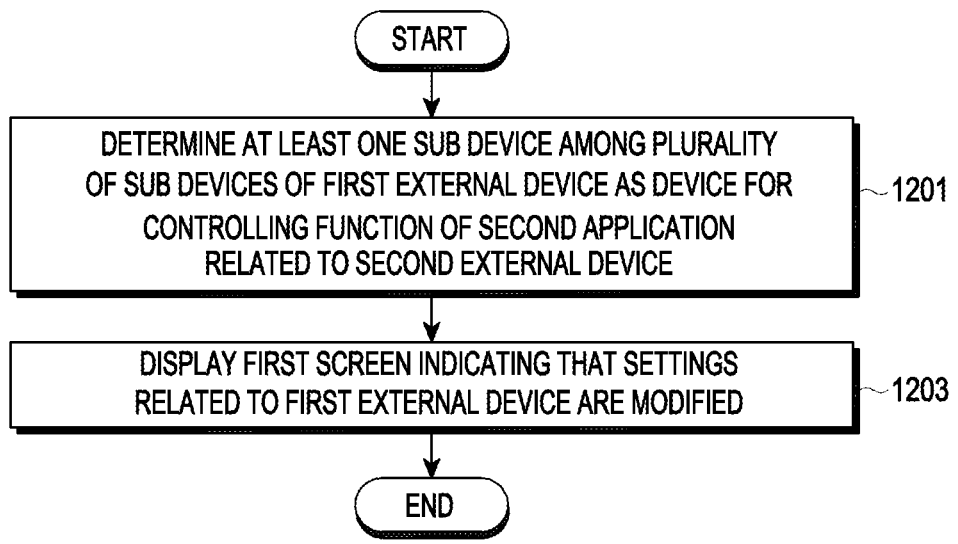
FIG. 12 is a flowchart illustrating an example method of operating an electronic device, according to various embodiments.

FIG. 12 is a flowchart illustrating an example method of operating an electronic device according to various embodiments. FIG. 12 will be described with reference to FIGS. 5 and 6.

Referring to FIG. 12, in operation 1201, according to various embodiments, the electronic device 600 (e.g., the processor 420) may determine at least one sub device (e.g., the first sub device 510) among the plurality of sub devices (e.g., the first sub device 510 and/or the second sub device 520) of the first external device 610 as a device (e.g., the control device) for controlling the function of the second application (e.g., the AR application) related to the second external device 620. The scheme to determine the control device has been described above with reference to FIGS. 6 through 11.

In operation 1203, according to various embodiments, the electronic device 600 may display a screen (e.g., a first screen) indicating that settings related to the first external device 610 have been modified on the display (e.g., the display module 460) of the electronic device 600 or the display (e.g., the display module 350) of the second external device 620. For example, the screen (e.g., the first screen) indicating that the settings related to the first external device 610 have been modified may include an object indicating which sub device among the plurality of sub devices (e.g., the first sub device 510 and/or the second sub device 520) of the first external device 610 has been determined as the control device for controlling the function of the second application (e.g., the AR application). For example, the electronic device 600 may display a screen (e.g., a first screen) indicating that settings related to the first external device 610 have been modified on the display (e.g., the display module 460) of the electronic device 600 or the display (e.g., the display module 350) of the second external device 620, based on identifying that the second communication connection with the second external device 620 is established.

Figure 13:
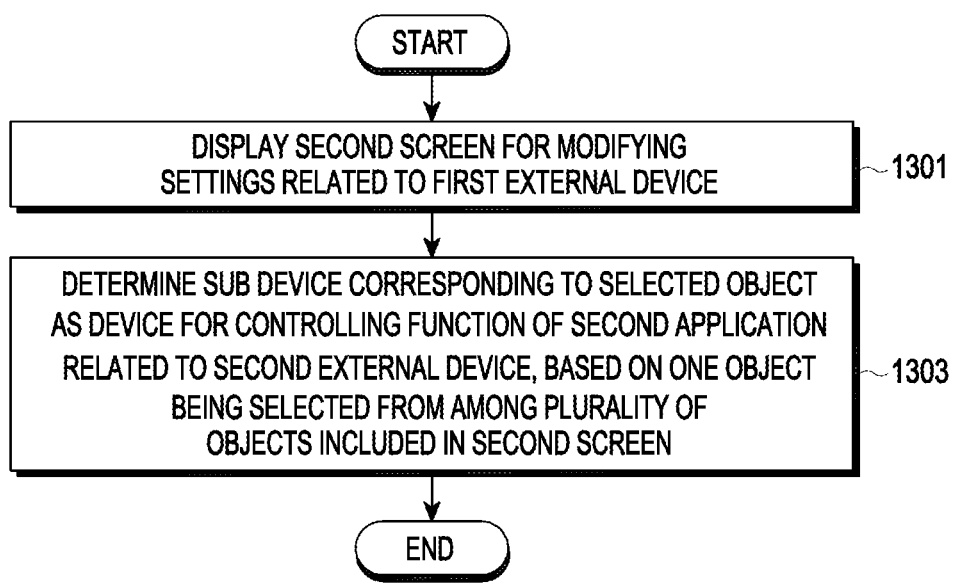
FIG. 13 is a flowchart illustrating an example method of operating an electronic device, according to various embodiments.

FIG. 13 is a flowchart illustrating an example method of operating an electronic device according to various embodiments. FIG. 13 will be described with reference to FIGS. 5 and 6.

Referring to FIG. 13, in operation 1301, according to various embodiments, the electronic device 600 (e.g., the processor 420) may display a screen (e.g., a second screen) for modifying the settings related to the first external device 610 on the display (e.g., the display module 460) of the electronic device 600 or the display (e.g., the display module 350) of the second external device 620. For example, the screen (e.g., the second screen) for modifying the settings related to the first external device 610 may include a plurality of objects respectively indicating the plurality of sub devices (e.g., the first sub device 510 and the second sub device 520) of the first external device 610, and there is no limitation in an object type. For example, the electronic device 600 may display a screen (e.g., the second screen) for modifying the settings related to the first external device 610 on the display (e.g., the display module 460) of the electronic device 600 or the display (e.g., the display module 350) of the second external device 620, based on identifying that the second communication connection with the second external device 620 is established.

In operation 1303, according to various embodiments, based on at least one object being selected from among a plurality of objects included in the screen (e.g., the second screen) for modifying the settings related to the first external device 610, the electronic device 600 may determine at least one sub device (e.g., at least one of the first sub device 510 or the second sub device 520 of the first external device 610) corresponding to the selected at least one object as the device (e.g., the control device) for controlling the function of the second application (e.g., the AR application) related to the second external device 620.

Figure 14:
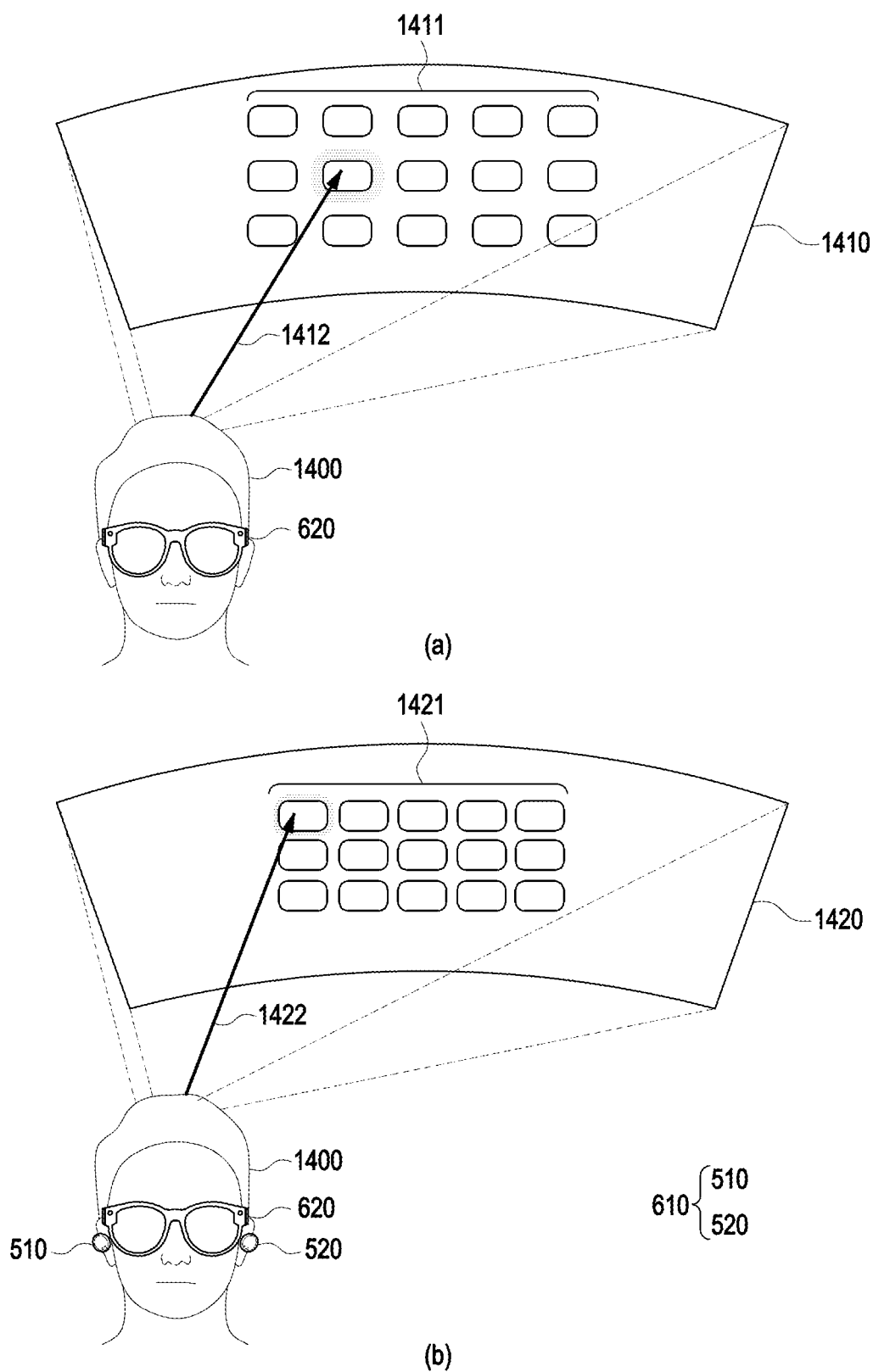
FIG. 14 is a diagram illustrating an example method of operating an electronic device, according to various embodiments.

FIG. 14 is a diagram illustrating an example method of operating an electronic device according to various embodiments. FIG. 14 will be described with reference to FIGS. 5 and 6.

According to various embodiments, the electronic device 600 (e.g., the processor 420) may identify a control scheme for the second application (e.g., the AR application) related to the second external device 620, and the control scheme has been described with reference to FIG. 11B. According to various embodiments, the electronic device 600 may control to change an arrangement of at least one object (e.g., 1411 or 1421) included in the screen (e.g., the AR screen) displayed on the display (e.g., the display module 350) of the second external device 620, based on the control scheme for the second application (e.g., the AR application) related to the second external device 620. For example, referring to FIG. 14, the electronic device 600 may transmit first screen data to the second external device 620 based on the control scheme for the second application (e.g., the AR application) related to the second external device 620 being a first control scheme (e.g., a scheme to control the second application based on a gaze input of the user) and transmit second screen data to the second external device 620 at least based on the control scheme for the second application (e.g., the AR application) being a second control scheme (e.g., a scheme to control the second application at least based on an input of an external device (e.g., the first sub device 510 or the second sub device 520), and the second external device 620 may display a first screen 1410 based on the first screen data and display a second screen 1420 based on the second screen data. For example, an arrangement interval of the at least one object 1421 included in the second screen 1420 may be narrower than that of the at least one object 1411 included in the first screen 1410.

For example, referring to (a) of FIG. 14, the electronic device 600 may transmit the first screen data (e.g., screen data in which an arrangement interval of at least one object (e.g., 1411) included in a screen (e.g., 1410) is wide) to the second external device 620 in a state where a control device corresponding to the second external device 620 is not determined, when the user does not wear the first external device 610 (e.g., the wearable electronic device in the form of an earphone). For example, in (a) of FIG. 14, the electronic device 600 may transmit the first screen data (e.g., the screen data in which the arrangement interval of at least one object (e.g., 1411) included in the screen (e.g., 1410) is wide) to the second external device 620, based on determining to control the second application (e.g., the AR application) related to the second external device 620 based on a gaze input 1412 of a user 1400.

In another example, although not shown, the electronic device 600 may transmit the first screen data (e.g., the screen data in which the arrangement interval of the at least one object (e.g., 1411) included in the screen (e.g., 1410) is wide) to the second external device 1410, based on the first control scheme (e.g., a scheme to select at least one object (e.g., 1411) included in an execution screen (e.g., 1410) of the second application based on a gaze input (e.g., 1412) of the user) being identified as the control scheme for the second application, even when the user wears the first external device 610 (e.g., the wearable electronic device in the form of an earphone).

In another example, referring to (b) of FIG. 14, when the user wears the first external device 610, the electronic device 610 may determine at least one sub device (e.g., the first sub device 510 or the second sub device 520) among the plurality of sub devices (e.g., the first sub device 510 and the second sub device 520) of the first external device 610 as the control device corresponding to the second external device 620. For example, the electronic device 600 may transmit the second screen data (e.g., screen data in which the arrangement interval of the at least one object (e.g., 1421) included in the screen (e.g., 1420) is narrow) to the second external device 1420, based on the second control scheme (e.g., a scheme to select (e.g., 1422) at least one object (e.g., 1421) included in an execution screen (e.g., 1420) of the second application based on an input (e.g., a swipe input or a touch input) of an external device (e.g., the first sub device 510 or the second sub device 520) determined as the control device) being identified as the control scheme for the second application related to the second external device 620.

FIG. 15 is a block diagram illustrating an example configuration of electronic devices in a network environment, according to various embodiments.

Referring to FIG. 15, electronic devices in a network environment may communicate with each other, and there is no limitation on a communication method.

Referring to FIG. 15, the network environment may include a wearable electronic device 1500 (e.g., the wearable electronic device 500 of FIG. 5 (e.g., the wearable electronic device in the form of an earphone)), the first external device 1510 (e.g., the electronic device 401 of FIG. 1), and the second external device 1520 (e.g., the wearable electronic device 100 of FIG. 1 (e.g., a wearable electronic device in the form of glasses)).

According to various embodiments, the wearable electronic device 1500 may communicate with the first external device 1510 and/or the second external device 1520. According to an embodiment, in FIG. 15, an embodiment is disclosed in which electronic devices (e.g., the first external device 1510 and the second external device 1520) in the network environment perform communication with the wearable electronic device 1500.

At least a part of the description made with reference to FIGS. 6 through 14 may be used within a range applicable to the embodiment of FIG. 15.

Figure 16:
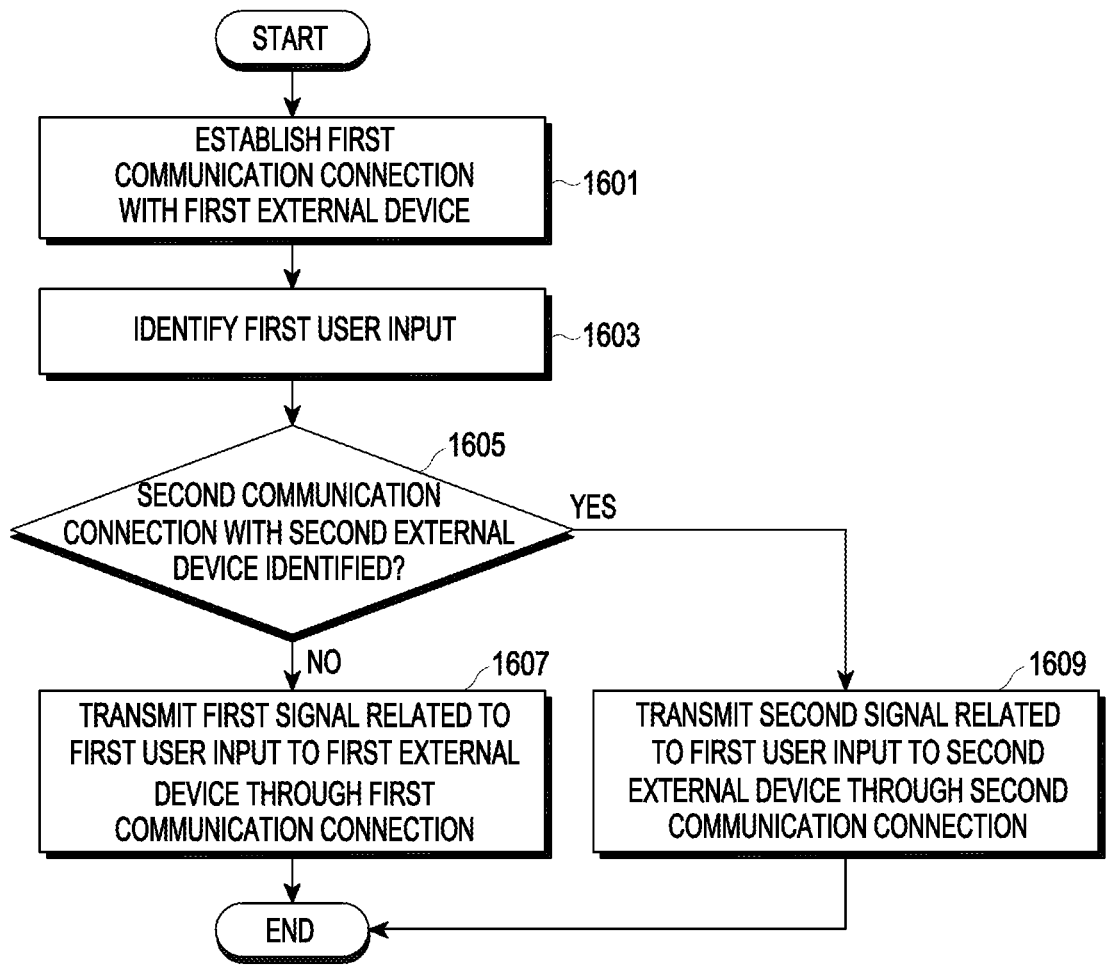
FIG. 16 is a flowchart illustrating an example method of operating a wearable electronic device, according to various embodiments.

FIG. 16 is a flowchart illustrating an example method of operating a wearable electronic device according to various embodiments. FIG. 16 will be described with reference to FIGS. 5 and 15.

Referring to FIG. 16, in operation 1601, according to various embodiments, the wearable electronic device 1500 (e.g., the wearable electronic device 500 (e.g., at least one processor (e.g., the processor 511) and/or the processor 521 of the wearable electronic device 500) may establish the first communication connection with the first external device 1510 (e.g., the wearable electronic device 401 of FIG. 4).

In operation 1603, according to various embodiments, the wearable electronic device 1500 may identify a user input. For example, the wearable electronic device 1500 may identify a user input (e.g., the first user input (e.g., a single touch, a double touch, a swipe, or a long press)) input through at least one sub device (e.g., the first sub device 510 or the second sub device 520) among a plurality of sub devices (e.g., the first sub device 510 and the second sub device 520 of FIG. 5).

In operation 1605, according to various embodiments, the wearable electronic device 1500 may identify whether a second communication connection with the second external device 1520 (e.g., the wearable electronic device 100 of FIG. 1) is established. For example, the wearable electronic device 1500 may be in a state in which a communication connection with the second external device 1520 has not been established, and in this case, operation 1607 may be performed. In another example, after establishing the first communication connection with the first external device 1510, the electronic device 600 may establish the second communication connection with the second external device 1520, or after establishing the second communication connection with the second external device 1520, the electronic device 600 may establish the first communication connection with the first external device 1510. The wearable electronic device 1500 may perform operation 1609 based on identifying that the second communication connection with the second external device 1520 has been established.

In operation 1607, according to various embodiments, the wearable electronic device 1500 may transmit a signal (e.g., the first signal) related to a user input (e.g., the first user input) to the first external device 1510 through the first communication connection, based on identifying that the second communication connection with the second external device 1520 has not been established. In this case, the electronic device 600 may perform the first function (e.g., playback, pause, playback of the previous song, playback of the next song, call reception, reception refusal, external sound listening, or AI service call) of the first application (e.g., the music application or the application providing the AI service) corresponding to the received signal, upon receiving the signal (e.g., the first signal) from the wearable electronic device 1500. For example, the first application (e.g., the music application) may be an application related to a unique function (e.g., sound playback) of the wearable electronic device 1500 (e.g., a wearable electronic device in the form of an earphone), and a type of the first application may not be limited. For example, the first application may be an application that provides an AI service.

In operation 1609, according to various embodiments, the wearable electronic device 1500 may transmit a signal (e.g., the second signal) related to a user input (e.g., the first user input) to the second external device 1520 through the second communication connection, based on identifying that the second communication connection with the second external device 1520 is established. For example, the second external device 1520 may perform the second function (e.g., selection of a virtual object, movement of a virtual pointer, or displaying of the next page) of the second application (e.g., the application for displaying a 3D screen) related to the second external device 620 corresponding to the received signal, upon receiving the signal (e.g., the second signal) from the wearable electronic device 1500. For example, the second application (e.g., the application for displaying the 3D screen) executed in the second external device 1520 may be an application related to a unique function (e.g., displaying of an AR display) of the second external device 1520 (e.g., a wearable electronic device in the form of AR glasses), and a type of the second application may not be limited. According to an embodiment, the wearable electronic device 1500 may transmit a signal (e.g., the second signal) related to a user input (e.g., the first user input) to the second external device 1520 through the second communication connection, based on a state in which the second application (e.g., the application for displaying a 3D screen) is executed in the second external device 1520 and on identifying that the second communication connection with the second external device 1520 is established.

Figure 17:
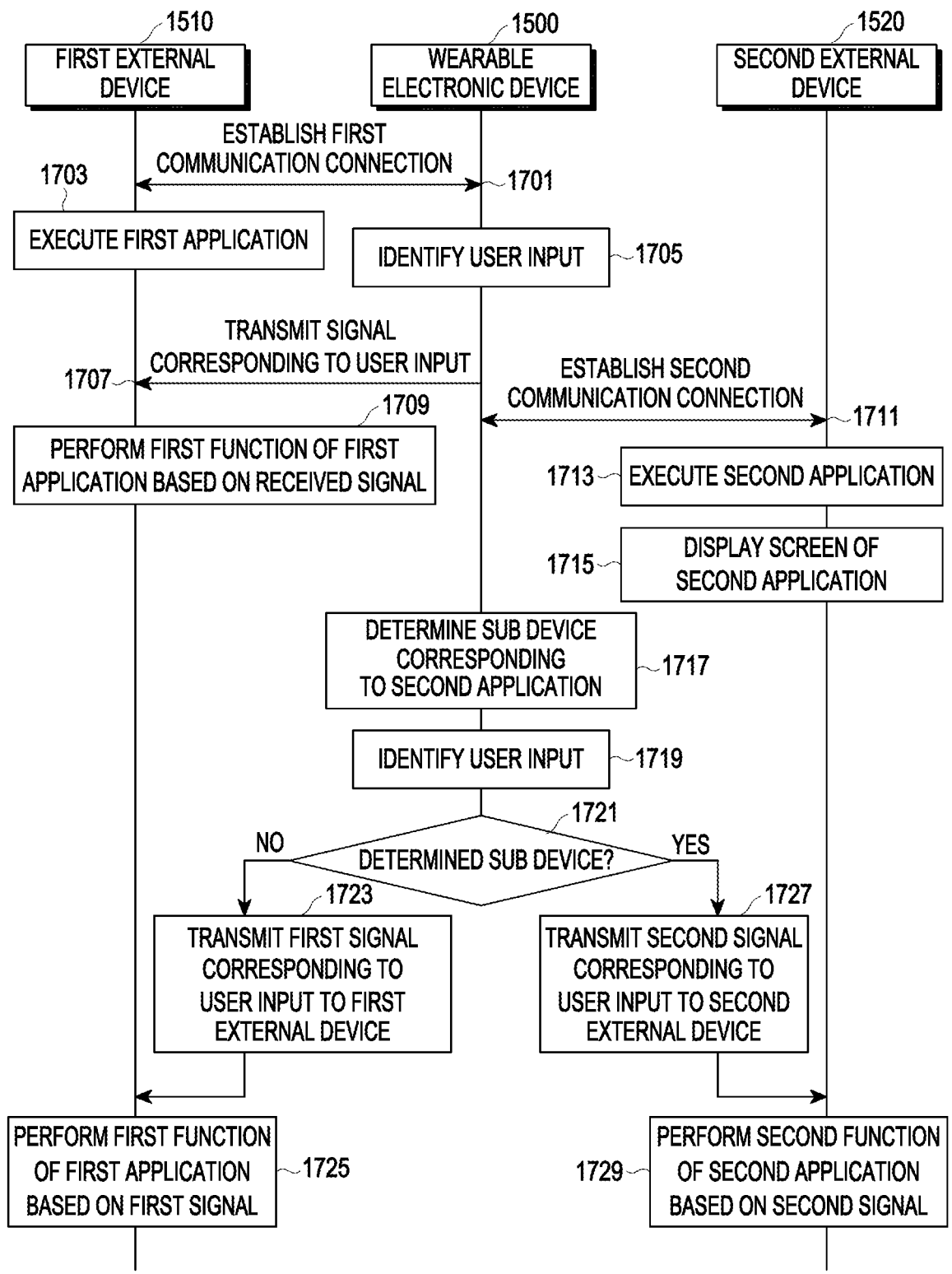
FIG. 17 is a signal flow diagram illustrating an example method of operating a wearable electronic device, according to various embodiments.

FIG. 17 is a signal flow diagram illustrating an example method of operating a wearable electronic device according to various embodiments. FIG. 17 will be described with reference to FIGS. 5, 15, and 16.

Referring to FIG. 17, in operation 1701, according to various embodiments, the wearable electronic device 1500 (e.g., the wearable electronic device 1500 (e.g., at least one processor (e.g., the processor 511) and/or the processor 521 of the wearable electronic device 500)) may establish the first communication connection with the first external device 1510 (e.g., the wearable electronic device 401 of FIG. 4).

In operation 1703, according to various embodiments, the first external device 1510 (e.g., the electronic device 401 (e.g., the processor 420) of FIG. 4) may execute the first application (e.g., the music application or the application providing the AI service). For example, the first external device 1510 may execute the first application (e.g., the music application) related to a unique function (e.g., sound playback) of the wearable electronic device 1500 (e.g., a wearable electronic device in the form of an earphone), and a type of the first application may not be limited. For example, the first application may be an application that provides an AI service.

In operation 1705, according to various embodiments, the wearable electronic device 1500 may identify a user input. For example, the wearable electronic device 1500 may identify a user input (e.g., a single touch, a double touch, a swipe, or a long press) input through at least one sub device (e.g., the first sub device 510 or the second sub device 520) among a plurality of sub devices (e.g., the first sub device 510 and the second sub device 520 of FIG. 5).

In operation 1707, according to various embodiments, the wearable electronic device 1500 may transmit a signal corresponding to the user input to the first external device 1510 through the first communication connection. For example, the wearable electronic device 1500 may transmit a signal corresponding to a user input to the first external device 1510 through the first communication connection, based on identifying that the second communication connection with the second external device 1520 has not been established. For example, the wearable electronic device 1500 may transmit a signal (e.g., the first signal) corresponding to the user input (e.g., the first user input) input through the first sub device 510 to the first external device 1510. For example, the wearable electronic device 1500 may transmit a signal (e.g., the second signal) corresponding to the user input (e.g., the second user input) input through the second sub device 520 to the first external device 1510.

In operation 1709, according to various embodiments, the first external device 1500 may perform the first function of the first application corresponding to a received signal (e.g., the first signal or the second signal), based on the signal (e.g., the first signal or the second signal) received from the wearable electronic device 1500. The function corresponding to the signal has been described above with reference to FIG. 9. For example, the first external device 1500 may perform the first function (e.g., playback, pause, playback of the previous song, playback of the next song, call reception, reception refusal, external sound listening, or AI call) of the first application (e.g., the music application or the application providing an AI service) corresponding to the first signal, upon receiving the first signal (e.g., a signal corresponding to a user input (e.g., the first user input) input through the first sub device 510) from the wearable electronic device 1500 through the first communication connection. Alternatively, for example, the first external device 1500 may perform the first function of the first application corresponding to the second signal, upon receiving the second signal (e.g., a signal corresponding to a user input (e.g., the second user input) input through the second sub device 520) from the wearable electronic device 1500 through the first communication connection.

In operation 1711, according to various embodiments, the wearable electronic device 1500 may establish the second communication connection with the second external device 1520 (e.g., the wearable electronic device 100 of FIG. 1).

In operation 1713, according to various embodiments, the second external device 1520 (e.g., the wearable electronic device 100 (e.g., the processor 320) of FIG. 1) may execute the second application (e.g., the AR application). For example, the second external device 1520 may execute the second application (e.g., the AR application for displaying a 3D screen) related to a unique function (e.g., displaying of the 3D screen) of the second external device 1520 (e.g., a wearable electronic device in the form of AR glasses), and a type of the second application may not be limited. For example, the second external device 1520 may execute the second application as the second communication connection with the wearable electronic device 1500 has been established. In another example, after establishment of the second communication connection with the wearable electronic device 1500, the second external device 1520 may execute the second application in response to the request for executing the second application. Alternatively, in another example, the second external device 1520 may execute the second application in response to the request for executing the second application in a state where the second communication connection with the wearable electronic device 1500 is not established, and may establish the second communication connection with the wearable electronic device 1500.

In operation 1715, according to various embodiments, the second external device 1520 may display a screen of the second application on a display (e.g., the display module 350 of FIG. 3).

In operation 1717, according to various embodiments, the wearable electronic device 1500 may determine a sub device corresponding to the second application related to the second external device 1520. When the wearable electronic device 1500 determines a sub device corresponding to the second application related to the second external device 1520, it may refer, for example, to at least one sub device (e.g., the first sub device 510 or the second sub device 520) among the plurality of sub devices (e.g., the first sub device 510 and the second sub device 520) of the wearable electronic device 1500 being determined as a device for controlling a function of the second application related to the second external device 1520. In this case, the sub device determined as the device for controlling the function of the second application related to the second external device 1520 may be referred to as a "determined sub device" or "control device", and sub devices other than the determined sub device may be referred to as "the other sub devices", which has been described above. For example, when the wearable electronic device 1500 determines the first sub device 510 (or the second sub device 520) as a control device, the wearable electronic device 1500 may transmit a signal corresponding to a user input being input through the first sub device 510 (or the second sub device 520) to the second external device 1520. A scheme for the wearable electronic device 1500 to determine the control device may use the scheme for the electronic device 600 to determine the control device. According to an embodiment, when at least one sub device (e.g., the first sub device 510 or the second sub device 520) among the plurality of sub devices (e.g., the first sub device 510 and the second sub device 520) of the wearable electronic device 1500 is determined as the control device, at least some of signals corresponding to user inputs input through the sub device determined as the control device may be transmitted to the second external device 1520. For example, at least some of the signals corresponding to the user inputs input through the sub device determined as the control device may be transmitted to the second external device 1520 and other at least some may be transmitted to the first external device 1510. Alternatively, for example, all signals corresponding to the user inputs input through the sub device determined as the control device may be transmitted to the second external device 1520. The description of FIG. 9 may be applied to an external device (e.g., the first external device 1510 or the second external device 1520) to which each signal is to be transmitted. For example, based on the mapping relationship described with reference to FIG. 9 (e.g., the mapping tables 910, 920, 930, and 940 or a mapping relationship set by the user), an external device (e.g., the first external device 1510 or the second external device 1520) to which each signal corresponding to each user input identified by the wearable electronic device 1500 is to be delivered may be determined. In an embodiment, the mapping relationship described with reference to FIG. 9 (e.g., the mapping tables 910, 920, 930, and 940 or the mapping relationship set by the user) may be reset (or rechanged) based on the wearing state of the external device (e.g., the first external device 1510 or the second external device 1520) (e.g., the wearing state of the first external device 1510 and/or the wearing state of the second external device 1520) and the communication connection state (e.g., the communication connection state between the wearable electronic device 1500 and the first external device 1510 and/or the second external device 1520).

In operation 1719, according to various embodiments, the wearable electronic device 1500 may identify a user input. Operation 1719 may be understood similarly to operation 1705.

In operation 1721, according to various embodiments, the wearable electronic device 1500 may determine whether the user input is input through a determined sub device (e.g., a control device). For example, the electronic device 1500 may identify a user input (e.g., the first user input) input through the first sub device 510 and a user input (e.g., the second user input) input through the second sub device 520.

In operation 1723, according to various embodiments, the wearable electronic device 1500 may transmit the signal (e.g., the first signal) corresponding to the user input to the first external device 1510, based on identifying a user input being input through another sub device other than the sub device determined as the control device.

In operation 1725, according to various embodiments, the first external device 1510 may perform the first function of the first application, based on the signal (e.g., the first signal) received from the wearable electronic device 1500.

In operation 1727, according to various embodiments, the wearable electronic device 1500 may transmit the signal (e.g., the second signal) corresponding to the user input to the second external device 1520, based on identifying the user input being input through the sub device determined as the control device.

In operation 1729, according to various embodiments, the second external device 1520 may perform the second function of the second application, based on the signal (e.g., the second signal) received from the wearable electronic device 1500.

Figure 18:
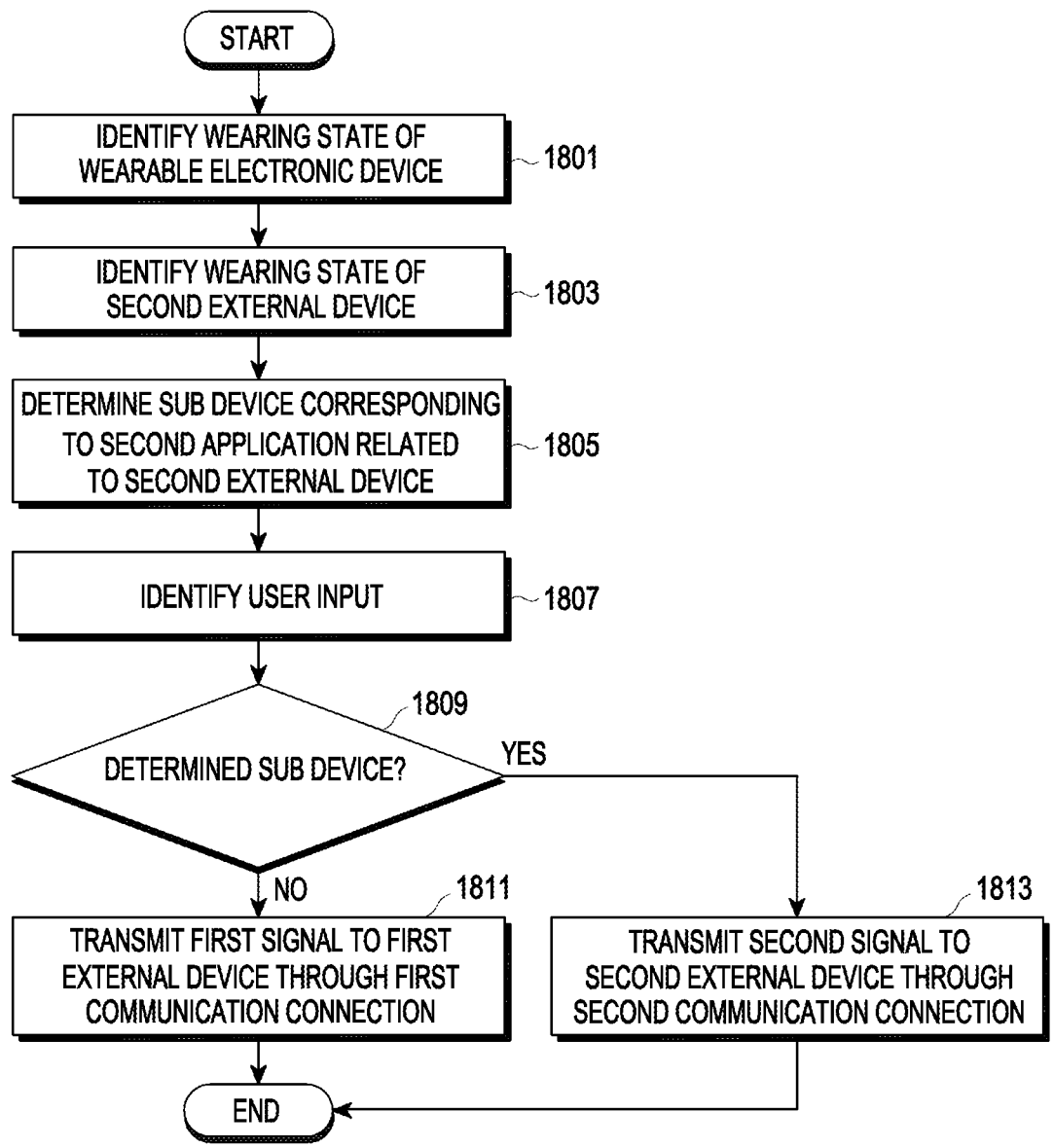
FIG. 18 is a flowchart illustrating an example method of operating a wearable electronic device, according to various embodiments.

FIG. 18 is a flowchart illustrating an example method of operating a wearable electronic device according to various embodiments. FIG. 18 will be described with reference to FIGS. 5, 15, and 16.

Referring to FIG. 18, in operation 1801, according to various embodiments, the wearable electronic device 1500 (e.g., the wearable electronic device 500 of FIG. 5 (e.g., at least one processor (e.g., the processor 511 and/or the processor 521) of the wearable electronic device 500)) may identify the wearing state of the wearable electronic device 1500 (e.g., the wearable electronic device in the form of an earphone). For example, the wearable electronic device 1500 may identify the wearing state of each of the plurality of sub devices (e.g., the first sub device 510 and the second sub device 520) of the wearable electronic device 1500. According to an embodiment, the wearable electronic device 1500 may transmit information about the wearing state of each of the plurality of sub devices (e.g., the first sub device 510 and the second sub device 520) to the first external device 1510.

In operation 1803, according to various embodiments, the wearable electronic device 1500 may identify the wearing state of the second external device 1520 (e.g., the wearable electronic device in the form of AR glasses). According to an embodiment, the second external device 1520 may transmit information about the wearing state of the second sub device 1520 to the wearable electronic device 1500. According to an embodiment, the second external device 1520 may transmit the information about the wearing state of the second external device 1520 to the first external device 1510 that may transmit the received information about the wearing state of the second external device 1520 to the wearable electronic device 1500.

In operation 1805, according to various embodiments, the wearable electronic device 1500 may determine at least one sub device among the plurality of sub devices (e.g., the first sub device 510 and/or the second sub device 520) of the wearable electronic device 1500 as a sub device (e.g., a control device) corresponding to the second application (e.g., the AR application) related to the second external device 1520, at least based on the wearing state of the wearable electronic device 1500 and/or the wearing state of the second external device 1520. For example, when the user is not wearing the second external device 1520, the wearable electronic device 1500 may not determine the sub device corresponding to the second application (e.g., the AR application) related to the second external device 1520. In this case, the wearable electronic device 1500 may transmit a signal corresponding to a user input being input through the first sub device 510 and/or the second sub device 520 of the wearable electronic device 1500 to the first external device 1510. Alternatively, for example, the wearable electronic device 1500 may determine that there is no sub device corresponding to the second application (e.g., the AR application) related to the second external device 1520, based on the user canceling the wearing of the second external device 1520, after determining the sub device (e.g., the first sub device 510 or the second sub device 520 of FIG. 5) corresponding to the second application (e.g., the AR application) related to the second external device 1520. In this case, the wearable electronic device 1500 may transmit a signal corresponding to a user input being input through the first sub device 510 and/or the second sub device 520 of the wearable electronic device 1500 to the first external device 1510. In another example, when the user is not wearing the wearable electronic device 1500, the wearable electronic device 1500 may not determine the sub device corresponding to the second application (e.g., the AR application) related to the second external device 620. In this case, the second external device 1520 may perform the second function (e.g., selection of a virtual object, movement of a virtual pointer, or displaying of the next page) of the second application (e.g., the application for displaying the 3D screen) related to the second external device 1520, based on a voice input of the user or a gaze input of the user identified using the second external device 1520. In another example, when the user is wearing the wearable electronic device 1500 and the second external device 1520, the wearable electronic device 1500 may determine at least one sub device (e.g., the first sub device 510 or the second sub device 520) among the plurality of sub devices (e.g., the first sub device 510 and the second sub device 520 of FIG. 5) of the wearable electronic device 1500 as the sub device corresponding to the second application (e.g., the AR application) related to the second external device 1520. In another example, when the user is wearing one sub device (e.g., the first external device 510 or the second external device 520) among the plurality of sub devices (e.g., the first sub device 510 and the second sub device 520 of FIG. 5) of the wearable electronic device 1500, the wearable electronic device 1500 may not determine the sub device corresponding to the second application (e.g., the AR application) related to the second external device 1520. In this case, the wearable electronic device 1500 may control to display a screen for selecting whether to control the second application (e.g., the AR application) related to the second external device 1520 on a display of the first external device 1510 (e.g., the display module 460) or a display of the second external device 1520 (e.g., the display module 350), using one sub device worn by the user (e.g., one of the first sub device 510 and the second sub device 520). In another example, when the user is not wearing the wearable electronic device 1500 and is wearing the second external device 1520, the wearable electronic device 1500 may determine at least one sub device (e.g., the first sub device 510 or the second sub device 520) among the plurality of sub devices (e.g., the first sub device 510 and the second sub device 520 of FIG. 5) of the wearable electronic device 1500 as the sub device corresponding to the second application (e.g., the AR application) related to the second external device 1520, based on a communication connection being established between the second external device 1520 and the wearable electronic device 1500. For example, the wearable electronic device 1500 may transmit a signal related to an input (e.g., a touch, a long press, a swipe input) identified through the wearable electronic device 1500 to the second external device 1520 in a state where the user does not wear the wearable electronic device 1500, based on a communication connection being established between the second external device 1520 and the wearable electronic device 1500. For example, the wearable electronic device 1500 may transmit a signal related to an input (e.g., a touch, a long press, a swipe input) identified through the wearable electronic device 1500 to the first external device 1510 and/or the second external device 1520 in a state where the user does not wear the wearable electronic device 1500, based on a communication connection being established between each of the first external device 1510 and the second external device 1520 and the wearable electronic device 1500. According to an embodiment, the wearable electronic device 1500 may determine at least one sub device among the plurality of sub devices (e.g., the first sub device 510 and/or the second sub device 520) of the wearable electronic device 1500 as a sub device (e.g., a control device) corresponding to the second application (e.g., the AR application) related to the second external device 1520, based on a wearing state (e.g., the wearing state of the wearable electronic device 1500 and/or the wearing state of the second external device 1520) and a communication connection state (e.g., a communication connection state between the wearable electronic device 1500 and the first external device 1500 and/or the second external device 1520). According to an embodiment, the wearable electronic device 1500 may change a sub device (e.g., a control device) corresponding to the second application (e.g., the AR application, based on the wearing state (e.g., the wearing state of the wearable electronic device 1500 and/or the wearing state of the second external device 1520) and the communication connection state (e.g., the communication connection state between the wearable electronic device 1500 and the first external device 1510 and/or the second external device 1520) being changed, even after determining the sub device (e.g., the control device) corresponding to the second application (e.g., the AR application) related to the second external device 1520. The description of a scheme to determine a control device based on the communication connection state described with reference to FIGS. 5 through 9 may be applied to the embodiment of FIGS. 15 through 18 in an applicable range. The above-described scheme for the wearable electronic device 1500 to determine the control device at least based on the wearing state of the wearable electronic device 1500 and/or the wearing state of the second external device 1520 may be merely an example and may not be limited.

In operation 1807, according to various embodiments, the wearable electronic device 1500 may identify a user input (e.g., the first user input and/or the second user input) being input through the first sub device 510 and/or the second sub device 520.

In operation 1809, according to various embodiments, the wearable electronic device 1500 may determine whether the identified user input is a user input being input through a sub device determined as a control device.

In operation 1811, according to various embodiments, the wearable electronic device 1500 may transmit the first signal corresponding to the identified user input to the first external device 1510 through the first communication connection, based on the identified user input being the user input being input through another sub device other than the sub device determined as the control device.

In operation 1813, according to various embodiments, the wearable electronic device 1500 may transmit the second signal corresponding to the identified user input to the second external device 1520 through the second communication connection, based on the identified user input being the user input being input through the sub device determined as the control device.

Figure 19:
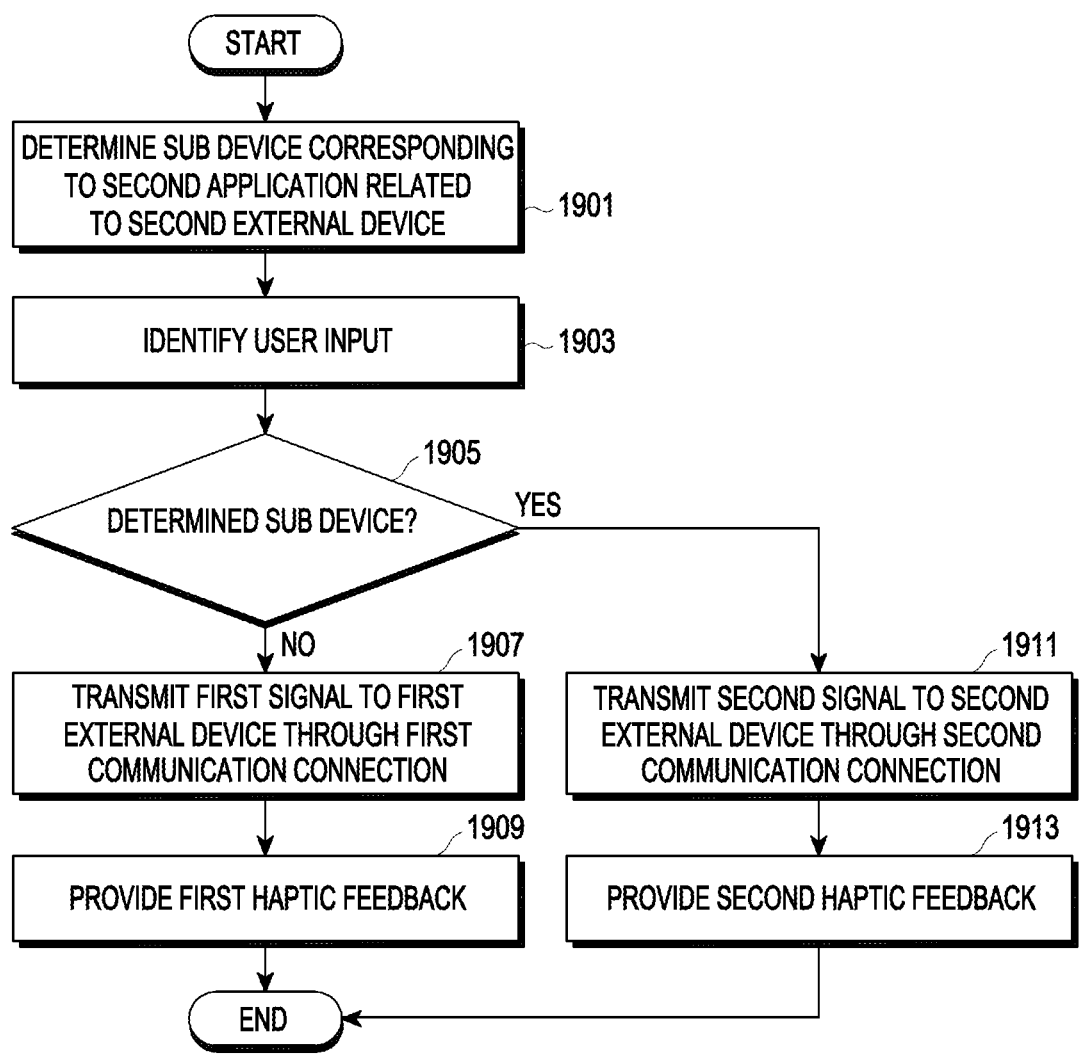
FIG. 19 is a flowchart illustrating an example method of operating a wearable electronic device, according to various embodiments.

FIG. 19 is a flowchart illustrating an example method of operating a wearable electronic device according to various embodiments. FIG. 19 will be described with reference to FIGS. 5, 15, and 16.

Referring to FIG. 19, in operation 1901, according to various embodiments, the wearable electronic device 1500 (e.g., the wearable electronic device 500 of FIG. 5 (e.g., at least one processor (e.g., the processor 511 and/or the processor 521) of the wearable electronic device 500)) may determine at least one sub device among the plurality of sub devices (e.g., the first sub device 510 and the second sub device 520) of the wearable electronic device 1500 as a sub device (e.g., a control device) corresponding to the second application (e.g., the AR application) related to the second external device 1520.

In operation 1903, according to various embodiments, the wearable electronic device 1500 may identify the user input being input through at least one sub device among the plurality of sub devices (e.g., the first sub device 510 and the second sub device 520 of FIG. 5) of the wearable electronic device 1500.

In operation 1905, according to various embodiments, the wearable electronic device 1500 may determine whether the identified user input is a user input being input through a sub device determined as a control device.

In operation 1907, according to various embodiments, the wearable electronic device 1500 may transmit the first signal corresponding to the identified user input to the first external device 1510 through the first communication connection, based on the identified user input being the user input being input through another sub device other than the sub device determined as the control device.

In operation 1909, according to various embodiments, the wearable electronic device 1500 may provide a designated first haptic feedback based on transmitting the first signal corresponding to the identified user input to the first external device 1510. The first haptic feedback may be a haptic feedback distinguished from a second haptic feedback, and a type thereof may not be limited.

In operation 1911, according to various embodiments, the wearable electronic device 1500 may transmit the second signal corresponding to the identified user input to the second external device 1520 through the second communication connection, based on the identified user input being the user input being input through the sub device determined as the control device.

In operation 1913, according to various embodiments, the wearable electronic device 1500 may provide a designated second haptic feedback based on transmitting the second signal corresponding to the identified user input to the second external device 1520. The second haptic feedback may be a haptic feedback distinguished from the first haptic feedback, and a type thereof may not be limited.

Those of ordinary skill in the art may understand that the various embodiments described herein may be organically applied to each other within an applicable range. For example, it would be understood by those of ordinary skill in the art that at least some operations of an embodiment described herein may be omitted and applied and at least some operations of an embodiment and at least some operations of another embodiment may be organically connected and applied.

According to various example embodiments, an electronic device (e.g., the electronic device 600 or the electronic device 401) may include: at least one communication module comprising communication circuitry (e.g., the communication module 490); and a processor (e.g., the processor 420), wherein the processor is configured to: establish a first communication connection with a first external device (e.g., the first external device 610 or the wearable electronic device 500) using the at least one communication module, receive a first signal from the first external device through the first communication connection, perform a first function of a first application corresponding to the first signal, upon receiving the first signal from the first external device through the first communication connection, based on identifying that a second communication connection with a second external device (e.g., the second external device 620 or the wearable electronic device 100) using the at least one communication module with a second external device is not established, and perform a second function of a second application related to the second external device corresponding to the first signal, upon receiving the first signal from the first external device through the first communication connection, based on identifying that the second communication connection with the second external device using the at least one communication module is established.

According to various example embodiments, the second application may be an application for displaying a three-dimensional (3D) screen using a display module (e.g., the display module 350) of the second external device.

According to various example embodiments, the processor may be configured to: perform the second function of the second application related to the second external device corresponding to the first signal, upon receiving the first signal from the first external device through the first communication connection, based on identifying execution of the second application related to the second external device and identifying that the second communication connection with the second external device is established.

According to various example embodiments, the processor may be configured to: perform the second function of the second application related to the second external device corresponding to the first signal, upon receiving the first signal from the first external device through the first communication connection, based on identifying a state in which the second external device is worn by a user and identifying that the second communication connection with the second external device is established.

According to various example embodiments, the processor may be configured to: perform the second function of the second application related to the second external device corresponding to the first signal upon receiving the first signal from the first external device through the first communication connection, based on identifying a state in which the first external device is worn by the user and identifying that the second communication connection with the second external device is established.

According to various example embodiments, the processor may be configured to: receive a second signal from the first external device through the first communication connection and perform the first function of the first application upon receiving the second signal.

According to various example embodiments, the first external device may include a first sub device (e.g., the first sub device 510) and a second sub device (e.g., the second sub device 520), the first signal may be a signal related to a first input of the first sub device, and the second signal may be a signal related to a second input of the second sub device.

According to various example embodiments, the processor may be configured to: identify a user's gesture input being input through a camera (e.g., the first camera 311, the second camera 312, and/or the third camera 313) of the second external device and perform the second function of the second application, upon receiving a signal related to the second input of the second sub device from the first external device through the first communication connection, based on the gesture input being input using a body part corresponding to the first sub device out of a body of the user.

According to various example embodiments, the processor may be configured to: perform the first function of the first application, upon receiving the first signal from the first external device through the first communication connection, in a state in which the second sub device is not worn by the user.

According to various example embodiments, the processor may be configured to: display a first screen indicating that settings related to the first external device are modified, on a display of the electronic device or a display of the second external device, based on identifying that the second communication connection with the second external device is established.

According to various example embodiments, the processor may be configured to: display a second screen for modifying settings related to the first external device on a display of the electronic device or a display of the second external device, based on identifying that the second communication connection with the second external device is established.

According to various example embodiments, the second screen for modifying the settings related to the first external device may include: an object for selecting at least one sub device (e.g., at least one of the first sub device 510 or the second sub device 520) from among a plurality of sub devices (e.g., the first sub device 510 and/or the second sub device 520) of the first external device, and the first signal is a signal related to an input of the at least one sub device selected from among the plurality of sub devices.

According to various example embodiments, the processor may be configured to change an arrangement of at least one object included in a screen displayed on a display of the second external device, based on determining that at least one sub device (e.g., at least one sub device of the first sub device 510 or the second sub device 520) among a plurality of sub devices (e.g., the first sub device 510 and/or the second sub device 520) of the first external device is used for function control of the second application related to the second external device.

According to various example embodiments, a wearable electronic device (e.g., the wearable electronic device 1500) may include: at least one communication module comprising communication circuitry (e.g., the communication module 512 and/or the communication module 522); and at least one processor (e.g., the processor 511 and/or the processor 521), wherein the at least one processor is configured to: establish a first communication connection with a first external device (e.g., the first external device 1510 or the electronic device 401) using the at least one communication module, identify a first input, control the at least one communication module to transmit a first signal related to the first input to the first external device through the first communication connection, based on identifying that a second communication connection with a second external device (e.g., the second external device 1520 or the wearable electronic device 100) using the at least one communication module is not established, and control the at least one communication module to transmit a second signal related to the first input to the second external device through the second communication connection, based on identifying that the second communication connection with the second external device using the at least one communication module is established.

According to various example embodiments, the at least one processor may be configured to: control the at least one communication module to transmit the second signal related to the first input to the second external device through the second communication connection, based on identifying execution of an application for displaying a three-dimensional (3D) screen in the second external device and identifying that the second communication connection with the second external device is established.

According to various example embodiments, the at least one processor may be configured to: control the at least one communication module to transmit the second signal related to the first input to the second external device through the second communication connection, based on identifying a state in which the second external device is worn by a user and identifying that the second communication connection with the second external device is established.

According to various example embodiments, the at least one processor may be configured to: control the at least one communication module to transmit the second signal related to the first input to the second external device through the second communication connection, based on identifying a state in which the wearable electronic device is worn by the user and identifying that the second communication connection with the second external device is established.

According to various example embodiments, the at least one processor may be configured to: identify a second input, and control the at least one communication module to transmit a third signal related to the second input to the first external device through the first communication connection.

According to various example embodiments, the wearable electronic device may include a first sub device (e.g., the first sub device 510) and a second sub device (e.g., the second sub device 520) in which the first input includes an input being input through the first sub device, and the second input includes an input being input through the second sub device.

According to various example embodiments, the at least one processor may be configured to control the wearable electronic device to provide a first haptic feedback, based on transmitting the first signal to the first external device and control to provide a second haptic feedback, based on transmitting the second signal to the second external device.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that when an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
at least one communication module comprising communication circuitry;
at least one processor; and
memory storing instructions that, when executed by the at least one processor, cause the electronic device to:
establish a first communication connection, using the at least one communication module, with a first external device,
receive a first signal from the first external device through the first communication connection,
identify whether a second communication connection, using the at least one communication module, is established with a second external device,
perform a first function of a first application corresponding to the first signal upon receiving the first signal from the first external device through the first communication connection, based on identifying that the second communication connection is not established, and
perform a second function of a second application related to the second external device corresponding to the first signal upon receiving the first signal from the first external device through the first communication connection, based on identifying that the second communication connection is established.

2. The electronic device of claim 1, wherein the second application comprises an application for displaying a three-dimensional (3D) screen using a display module of the second external device.

3. The electronic device of claim 1, wherein the instructions, when executed by the at least one processor, cause the electronic device to: perform the second function of the second application, based on identifying execution of the second application related to the second external device.

4. The electronic device of claim 1, wherein the instructions, when executed by the at least one processor, cause the electronic device to: perform the second function of the second application, based on identifying a state in which the second external device is worn by a user.

5. The electronic device of claim 4, wherein the instructions, when executed by the at least one processor, cause the electronic device to: perform the second function of the second application, based on identifying a state in which the first external device is worn by the user.

6. The electronic device of claim 1, wherein the instructions, when executed by the at least one processor, cause the electronic device to:
receive a second signal from the first external device through the first communication connection, and
perform the first function of the first application upon receiving the second signal.

7. The electronic device of claim 6, wherein the first external device includes a first sub device and a second sub device,
wherein the first signal is a signal related to a first input of the first sub device, and
wherein the second signal is a signal related to a second input of the second sub device.

8. The electronic device of claim 7, wherein the instructions, when executed by the at least one processor, cause the electronic device to:
identify a gesture input using a camera of the second external device, and
perform the second function of the second application upon receiving a signal related to the second input of the second sub device, based on the gesture input being input using a body part corresponding to the first sub device.

9. The electronic device of claim 7, wherein the instructions, when executed by the at least one processor, cause the electronic device to: perform the first function of the first application, in a state in which the second sub device is not worn by the user.

10. The electronic device of claim 1, wherein the instructions, when executed by the at least one processor, cause the electronic device to: display a first screen indicating that settings related to the first external device are modified on a display of the electronic device or a display of the second external device, based on identifying that the second communication connection with the second external device is established.

11. The electronic device of claim 1, wherein the instructions, when executed by the at least one processor, cause the electronic device to: display a second screen for modifying settings related to the first external device on a display of the electronic device or a display of the second external device, based on identifying that the second communication connection with the second external device is established.

12. The electronic device of claim 11, wherein the second screen for modifying the settings related to the first external device includes an object for selecting at least one sub device from among a plurality of sub devices of the first external device, and
wherein the first signal comprises a signal related to an input of the at least one sub device selected from among the plurality of sub devices.

13. The electronic device of claim 1, wherein the instructions, when executed by the at least one processor, cause the electronic device to: change an arrangement of at least one object included in a screen displayed on a display of the second external device, based on determining that at least one sub device among a plurality of sub devices of the first external device is used for function control of the second application related to the second external device.

14. A wearable electronic device comprising:
at least one communication module comprising communication circuitry;
at least one processor; and
memory storing instructions that, when executed by the at least one processor, cause the wearable electronic device to:
establish a first communication connection, using the at least one communication module, with a first external device,
identify a first input,
identify whether a second communication connection, using the at least one communication module, is established with a second external device,
control the at least one communication module to transmit a first signal related to the first input to the first external device through the first communication connection, based on identifying that the second communication connection is not established, and
control the at least one communication module to transmit a second signal related to the first input to the second external device through the second communication connection, based on identifying that the second communication connection is established.

15. The wearable electronic device of claim 14, wherein the instructions, when executed by the at least one processor, cause the wearable electronic device to: control the at least one communication module to transmit the second signal, based on identifying execution of an application for displaying a three-dimensional (3D) screen in the second external device.

16. The wearable electronic device of claim 14, wherein the instructions, when executed by the at least one processor, cause the wearable electronic device to: control the at least one communication module to transmit the second signal, based on identifying a state in which the second external device is worn by a user.

17. The wearable electronic device of claim 14, wherein the instructions, when executed by the at least one processor, cause the wearable electronic device to: control the at least one communication module to transmit the second signal, based on identifying a state in which the wearable electronic device is worn by a user.

18. The wearable electronic device of claim 14, wherein the instructions, when executed by the at least one processor, cause the wearable electronic device to:
identify a second input, and
control the at least one communication module to transmit a third signal related to the second input to the first external device through the first communication connection.

19. The wearable electronic device of claim 18, further comprising:
a first sub device and a second sub device,
wherein the first input comprises an input through the first sub device, and
wherein the second input comprises an input through the second sub device.

20. The wearable electronic device of claim 14, wherein the instructions, when executed by the at least one processor, cause the wearable electronic device to:
provide a first haptic feedback, based on transmitting the first signal to the first external device, and
provide a second haptic feedback, based on transmitting the second signal to the second external device.

* * * * *